United States Patent
Lee et al.

(10) Patent No.: US 11,963,114 B2
(45) Date of Patent: Apr. 16, 2024

(54) METHOD AND APPARATUS FOR DETERMINING WHETHER TO TRANSMIT SYNCHRONIZATION INFORMATION IN NR V2X

(71) Applicant: LG ELECTRONICS INC., Seoul (KR)

(72) Inventors: Seungmin Lee, Seoul (KR); Hanbyul Seo, Seoul (KR); Hyukjin Chae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 17/286,602

(22) PCT Filed: Oct. 25, 2019

(86) PCT No.: PCT/KR2019/014176
§ 371 (c)(1),
(2) Date: Apr. 19, 2021

(87) PCT Pub. No.: WO2020/085853
PCT Pub. Date: Apr. 30, 2020

(65) Prior Publication Data
US 2021/0377884 A1  Dec. 2, 2021

Related U.S. Application Data

(60) Provisional application No. 62/843,324, filed on May 3, 2019, provisional application No. 62/750,758, filed on Oct. 25, 2018.

(51) Int. Cl.
*H04W 56/00* (2009.01)
*H04W 72/02* (2009.01)
(Continued)

(52) U.S. Cl.
CPC ......... *H04W 56/001* (2013.01); *H04W 72/02* (2013.01); *H04W 72/0453* (2013.01); *H04W 72/52* (2023.01); *H04W 72/56* (2023.01)

(58) Field of Classification Search
CPC .............. H04W 56/001; H04W 72/02; H04W 72/0453; H04W 72/52; H04W 72/56; H04J 11/00
See application file for complete search history.

(56) References Cited

U.S. PATENT DOCUMENTS

2018/0139710 A1* 5/2018 Li ........................ H04W 56/00
2018/0248642 A1* 8/2018 Si ........................ H04L 27/2666
(Continued)

FOREIGN PATENT DOCUMENTS

KR  1020170093333  8/2017

OTHER PUBLICATIONS

Nokia et al., "Discussion on NR V2X Sidelink Synchronization," 3GPP TSG-RAN WG1 Meeting #94bis, Chengdu, China, R1-1811428, Sep. 29, 2018, See section 2.
(Continued)

*Primary Examiner* — Christine Ng
(74) *Attorney, Agent, or Firm* — BRYAN CAVE LEIGHTON PAISNER LLP

(57) ABSTRACT

Provided is a method of, by a first device 100, performing sidelink communication. The method includes configuring a carrier for New RAT (NR) sidelink communication, obtaining first synchronization associated with the NR sidelink communication from second synchronization associated with Long Term Evolution (LTE) sidelink communication, and determining whether to transmit synchronization information associated with the NR sidelink communication over the carrier.

14 Claims, 35 Drawing Sheets

(51) Int. Cl.
*H04W 72/0453* (2023.01)
*H04W 72/52* (2023.01)
*H04W 72/56* (2023.01)

(56) References Cited

U.S. PATENT DOCUMENTS

| | | | | |
|---|---|---|---|---|
| 2021/0176723 | A1* | 6/2021 | Khoryaev | H04W 56/0015 |
| 2021/0185628 | A1* | 6/2021 | Huang | G01S 19/05 |
| 2021/0235406 | A1* | 7/2021 | Liu | H04L 27/2607 |
| 2021/0321345 | A1* | 10/2021 | Zhao | H04W 72/0453 |
| 2021/0329598 | A1* | 10/2021 | Wang | H04W 4/40 |
| 2022/0053439 | A1* | 2/2022 | Hu | H04W 56/0015 |

OTHER PUBLICATIONS

Interdigital Inc., "On Sidelink Synchronization for NR V2X," 3GPP TSG RAN WG1 Meeting #94bis, Chengdu, China, R1-1811214, Sep. 29, 2018, See sections 3, 4.

ZTE, "Discussion about Synchronization Mechanism," 3GPP TSG RAN WG1 Meeting #94bis, Chengdu, China, R1-1810723, Sep. 28, 2018, See section 2.3.

\* cited by examiner (a)

(b)

(a)

(b)

Option 1A

Option 1B

Option 2

Option 3

METHOD AND APPARATUS FOR DETERMINING WHETHER TO TRANSMIT SYNCHRONIZATION INFORMATION IN NR V2X

This application is the National Stage filing under 35 U.S.C. 371 of International Application No. PCT/KR2019/014176 filed on Oct. 25, 2019, which claims the benefit of U.S. Provisional Application Nos. 62/750,758 filed on Oct. 25, 2018 and 62/843,324 filed on May 3, 2019, the contents of which are all hereby incorporated by reference herein in their entirety.

BACKGROUND OF THE INVENTION

Field of the Disclosure

The present disclosure relates to a wireless communication system.

Related Art

A wireless communication system is a multiple access system that supports communication of multiple users by sharing available system resources (e.g. a bandwidth, transmission power, etc.) among them. Examples of multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

Meanwhile, a wireless communication system needs to estimate an uplink channel or downlink channel for data transmission/reception, system synchronization acquisition, channel information feedback, and so on. In a wireless communication system environment, fading occurs due to multi path time latency. A process of recovering a transmission signal by compensating distortion in a signal, which is caused by an abrupt environment change due to fading, is referred to as channel estimation. Additionally, a channel state for a cell to which the UE belongs or another cell needs to be measured. For channel estimation or channel state measurement, channel estimation is generally performed by using a reference signal (RS), which is mutually known between transceivers.

A UE may perform measurement using the following three methods.

1) Reference signal received power (RSRP): RSRP indicates the average received power of all resource elements (REs) carrying CRSs transmitted over the entire band. Here, the UE may measure the average received power of all REs carrying channel state information (CSI) RSs instead of CRSs.

2) Received signal strength indicator (RSSI): RSSI indicates received power measured over the entire band. RSSI includes all of a signal, interference, and thermal noise.

3) Reference symbol received quality (RSRQ): RSRQ indicates a channel quality indicator (CQI) and may be determined as RSRP/RSSI depending on a bandwidth or a sub-band. That is, RSRQ refers to signal-to-interference-plus-noise-ratio (SINR). Since RSRP does not provide sufficient mobility information, RSRQ may be used instead of RSRP in a handover or cell reselection process.

RSRQ may be calculated by RSSI/RSSP. Alternatively, RSRQ may be calculated by N*RSSI/RSSP. Here, N may be a parameter (for example, the number of PRBs) or a function associated with a bandwidth in which RSSI is measured.

Meanwhile, sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive MTC, Ultra-Reliable and Low Latency Communication (URLLC), and so on, may be referred to as a new radio access technology (RAT) or new radio (NR). Herein, the NR may also support vehicle-to-everything (V2X) communication.

SUMMARY OF THE INVENTION

Meanwhile, there is a need to propose a method of enabling sideline communication related to different RATs to coexist.

In an embodiment, provided is a method of, by a first device 100, performing sidelink communication. The method may comprise configuring a carrier for New RAT (NR) sidelink communication, obtaining first synchronization associated with the NR sidelink communication from second synchronization associated with Long Term Evolution (LTE) sidelink communication, and determining whether to transmit synchronization information associated with the NR sidelink communication over the carrier.

In an embodiment, provided is a first device 100 for performing sidelink communication. The first device 100 may comprise one or more memories, one or more transceivers, and one or more processors configured to connect the one or more memories and the one or more transceivers. The processor may be configured to configure a carrier for New RAT (NR) sidelink communication, to obtain first synchronization associated with the NR sidelink communication from second synchronization associated with Long Term Evolution (LTE) sidelink communication, and to determine whether to transmit synchronization information associated with the NR sidelink communication over the carrier.

A UE may efficiently perform synchronization.

DESCRIPTION OF EXEMPLARY EMBODIMENTS

In various embodiments of the present disclosure, it shall be interpreted that "/" and "," indicate "and/or". For example, "A/B" may mean "A and/or B". Additionally, "A, B" may also mean "A and/or B". Moreover, "A/B/C" may mean "at least one of A, B and/or C". Furthermore, "A, B, C" may also mean "at least one of A, B and/or C".

Furthermore, in various embodiments of the present disclosure, it shall be interpreted that "or" indicates "and/or". For example, "A or B" may include "only A", "only B", and/or "both A and B". In other words, in various embodiments of the present disclosure, it shall be interpreted that "or" indicates "additionally or alternatively".

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features of the present disclosure will not be limited only to this.

Figure 1:
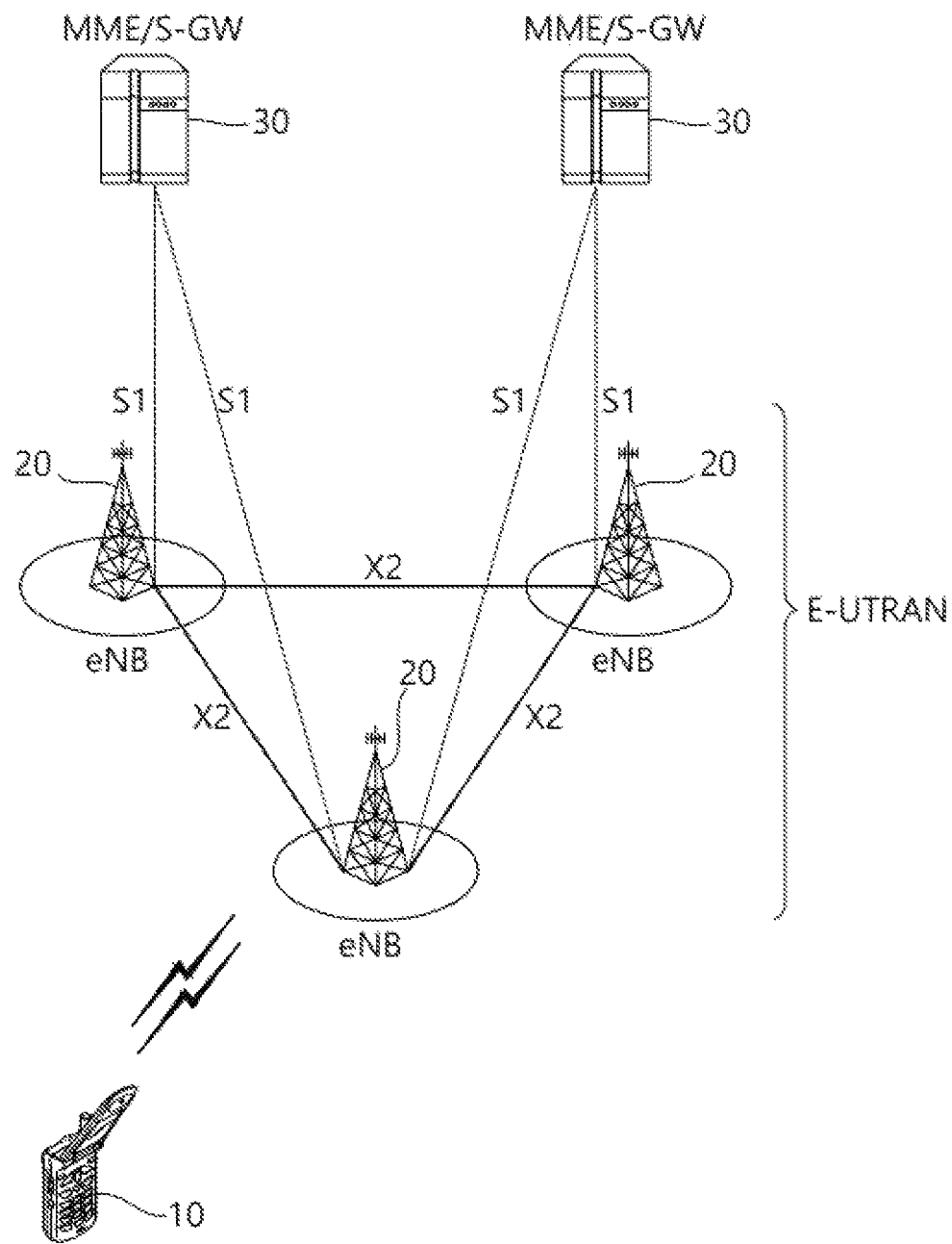
FIG. 1 shows a structure of an LTE system, in accordance with an embodiment of the present disclosure.

FIG. 1 shows a structure of an LTE system, in accordance with an embodiment of the present disclosure. This may also be referred to as an Evolved-UMTS Terrestrial Radio Access Network (E-UTRAN), or a Long Term Evolution (LTE)/LTE-A system.

Referring to FIG. 1, the E-UTRAN includes a base station (BS) 20, which provides a control plane and a user plane to a user equipment (UE) 10. The UE 10 may be fixed or mobile and may also be referred to by using different terms, such as Mobile Station (MS), User Terminal (UT), Subscriber Station (SS), Mobile Terminal (MT), wireless device, and so on. The base station 20 refers to a fixed station that communicates with the UE 10 and may also be referred to by using different terms, such as evolved-NodeB (eNB), Base Transceiver System (BTS), Access Point (AP), and so on.

The base stations 20 are interconnected to one another through an X2 interface. The base stations 20 are connected to an Evolved Packet Core (EPC) 30 through an S1 interface. More specifically, the base station 20 are connected to a Mobility Management Entity (MME) through an S1-MME interface and connected to Serving Gateway (S-GW) through an S1-U interface.

The EPC 30 is configured of an MME, an S-GW, and a Packet Data Network-Gateway (P-GW). The MME has UE access information or UE capability information, and such information may be primarily used in UE mobility management. The S-GW corresponds to a gateway having an E-UTRAN as its endpoint. And, the P-GW corresponds to a gateway having a Packet Data Network (PDN) as its endpoint.

Layers of a radio interface protocol between the UE and the network may be classified into a first layer (L1), a second layer (L2), and a third layer (L3) based on the lower three layers of an open system interconnection (OSI) model, which is well-known in the communication system. Herein, a physical layer belonging to the first layer provides a physical channel using an Information Transfer Service, and a Radio Resource Control (RRC) layer, which is located in the third layer, executes a function of controlling radio resources between the UE and the network. For this, the RRC layer exchanges RRC messages between the UE and the base station.

Figure 2:
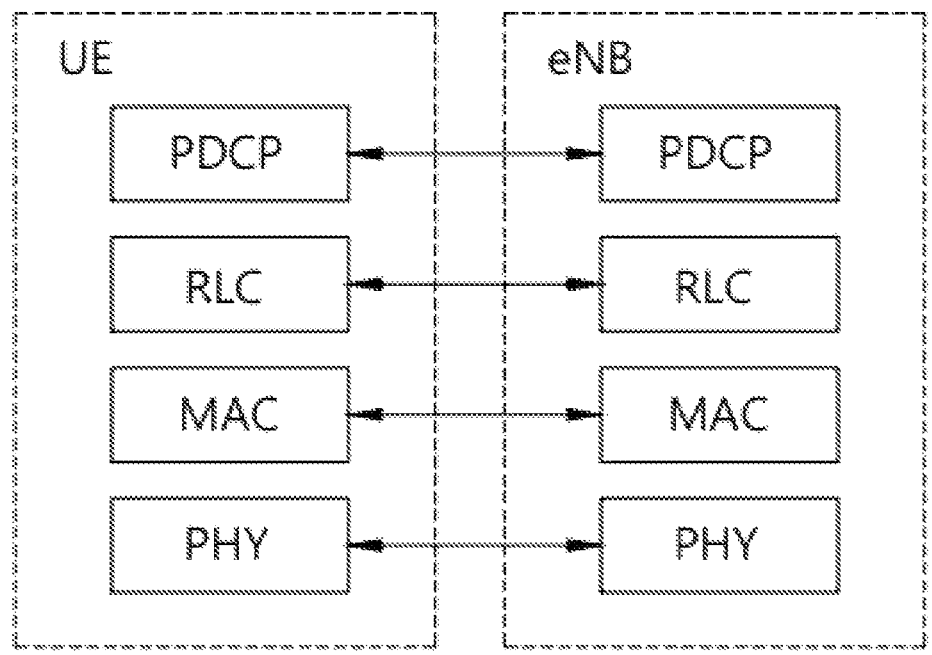
FIG. 2 shows a radio protocol architecture of a user plane, in accordance with an embodiment of the present disclosure.
Figure 3:
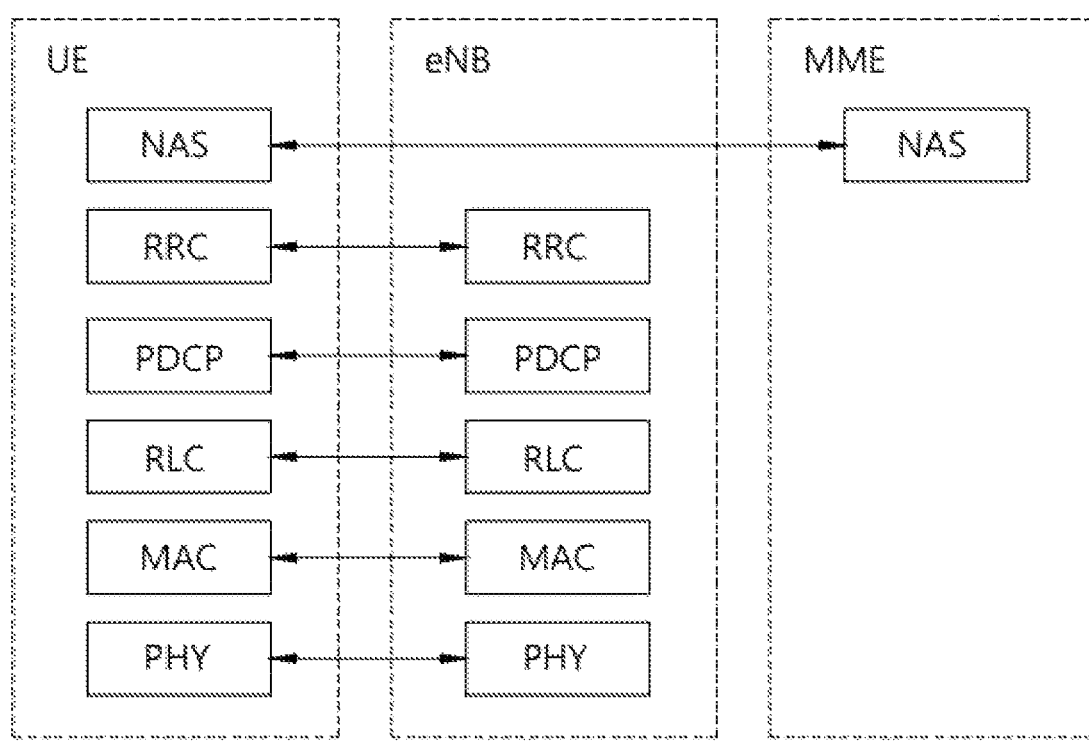
FIG. 3 shows a radio protocol architecture of a control plane, in accordance with an embodiment of the present disclosure.

FIG. 2 shows a radio protocol architecture of a user plane, in accordance with an embodiment of the present disclosure. FIG. 3 shows a radio protocol architecture of a control plane, in accordance with an embodiment of the present disclosure. The user plane is a protocol stack for user data transmission, and the control plane is a protocol stack for control signal transmission.

Referring to FIG. 2 and FIG. 3, a physical (PHY) layer belongs to the L1. A physical (PHY) layer provides an information transfer service to a higher layer through a physical channel. The PHY layer is connected to a medium access control (MAC) layer. Data is transferred (or transported) between the MAC layer and the PHY layer through a transport channel. The transport channel is sorted (or categorized) depending upon how and according to which characteristics data is being transferred through the radio interface.

Between different PHY layers, i.e., a PHY layer of a transmitter and a PHY layer of a receiver, data is transferred through the physical channel. The physical channel may be modulated by using an orthogonal frequency division multiplexing (OFDM) scheme and uses time and frequency as radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure various quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

The radio resource control (RRC) layer is defined only in a control plane. And, the RRC layer performs a function of controlling logical channel, transport channels, and physical channels in relation with configuration, re-configuration, and release of radio bearers. The RB refers to a logical path being provided by the first layer (PHY layer) and the second layer (MAC layer, RLC layer, Packet Data Convergence Protocol (PDCP) layer) in order to transport data between the UE and the network.

Functions of a PDCP layer in the user plane include transfer, header compression, and ciphering of user data. Functions of a PDCP layer in the control plane include transfer and ciphering/integrity protection of control plane data.

The configuration of the RB refers to a process for specifying a radio protocol layer and channel properties in order to provide a particular service and for determining respective detailed parameters and operation methods. The RB may then be classified into two types, i.e., a signaling radio bearer (SRB) and a data radio bearer (DRB). The SRB is used as a path for transmitting an RRC message in the control plane, and the DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the base station is released.

Downlink transport channels transmitting (or transporting) data from a network to a UE include a Broadcast Channel (BCH) transmitting system information and a downlink Shared Channel (SCH) transmitting other user traffic or control messages. Traffic or control messages of downlink multicast or broadcast services may be transmitted via the downlink SCH or may be transmitted via a separate downlink Multicast Channel (MCH). Meanwhile, uplink transport channels transmitting (or transporting) data from a UE to a network include a Random Access Channel (RACH) transmitting initial control messages and an uplink Shared Channel (SCH) transmitting other user traffic or control messages.

Logical channels existing at a higher level than the transmission channel and being mapped to the transmission channel may include a Broadcast Control Channel (BCCH), a Paging Control Channel (PCCH), a Common Control Channel (CCCH), a Multicast Control Channel (MCCH), a Multicast Traffic Channel (MTCH), and so on.

A physical channel is configured of a plurality of OFDM symbols in the time domain and a plurality of sub-carriers in the frequency domain. One subframe is configured of a plurality of OFDM symbols in the time domain. A resource block is configured of a plurality of OFDM symbols and a plurality of sub-carriers in resource allocation units. Additionally, each subframe may use specific sub-carriers of specific OFDM symbols (e.g., first OFDM symbol) of the corresponding subframe for a Physical Downlink Control Channel (PDCCH), i.e., L1/L2 control channels. A Transmission Time Interval (TTI) refers to a unit time of a subframe transmission.

Figure 4:
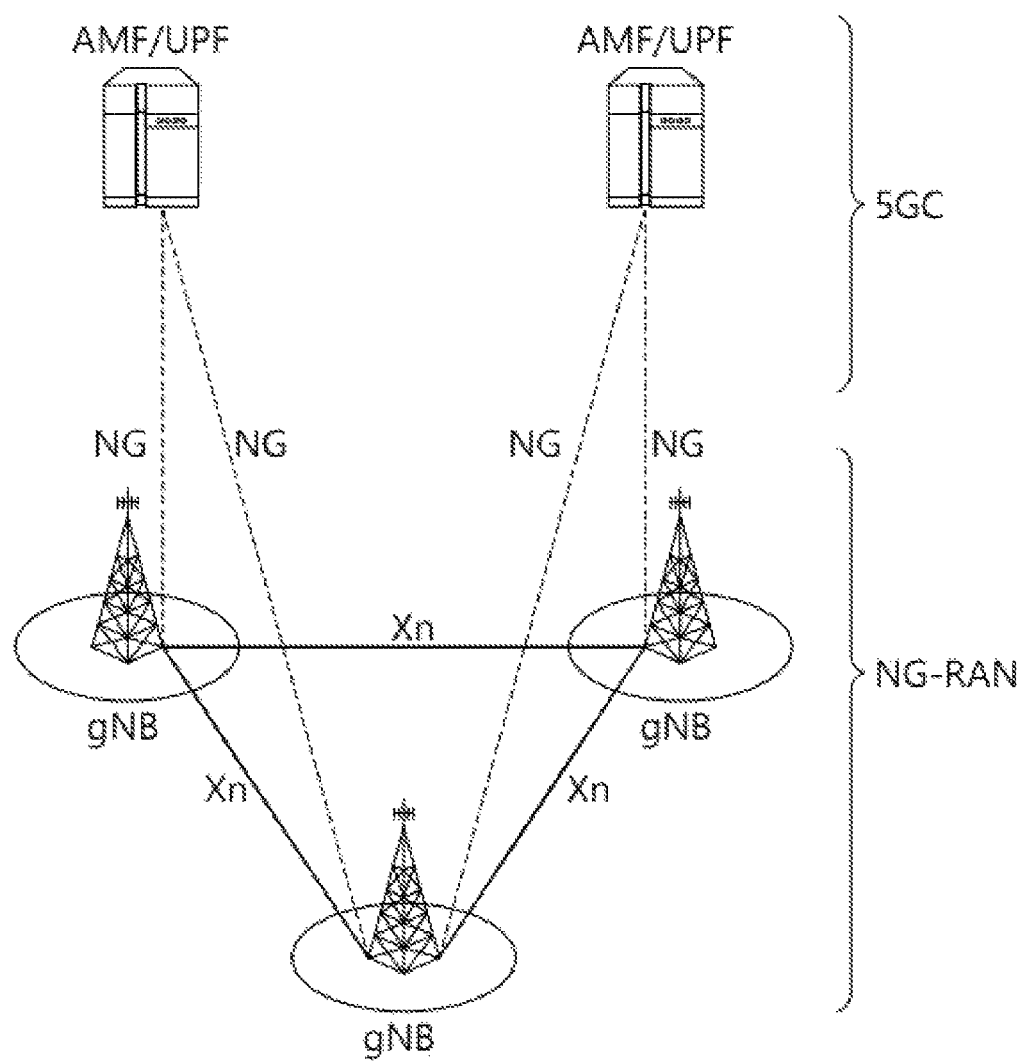
FIG. 4 shows a structure of an NR system, in accordance with an embodiment of the present disclosure.

FIG. 4 shows a structure of an NR system, in accordance with an embodiment of the present disclosure.

Referring to FIG. 4, a Next Generation-Radio Access Network (NG-RAN) may include a next generation-Node B (gNB) and/or eNB providing a user plane and control plane protocol termination to a user. FIG. 4 shows a case where the NG-RAN includes only the gNB. The gNB and the eNB are connected to one another via Xn interface. The gNB and the eNB are connected to one another via $5^{th}$ Generation (5G) Core Network (5GC) and NG interface. More specifically, the gNB and the eNB are connected to an access and mobility management function (AMF) via NG-C interface, and the gNB and the eNB are connected to a user plane function (UPF) via NG-U interface.

Figure 5:
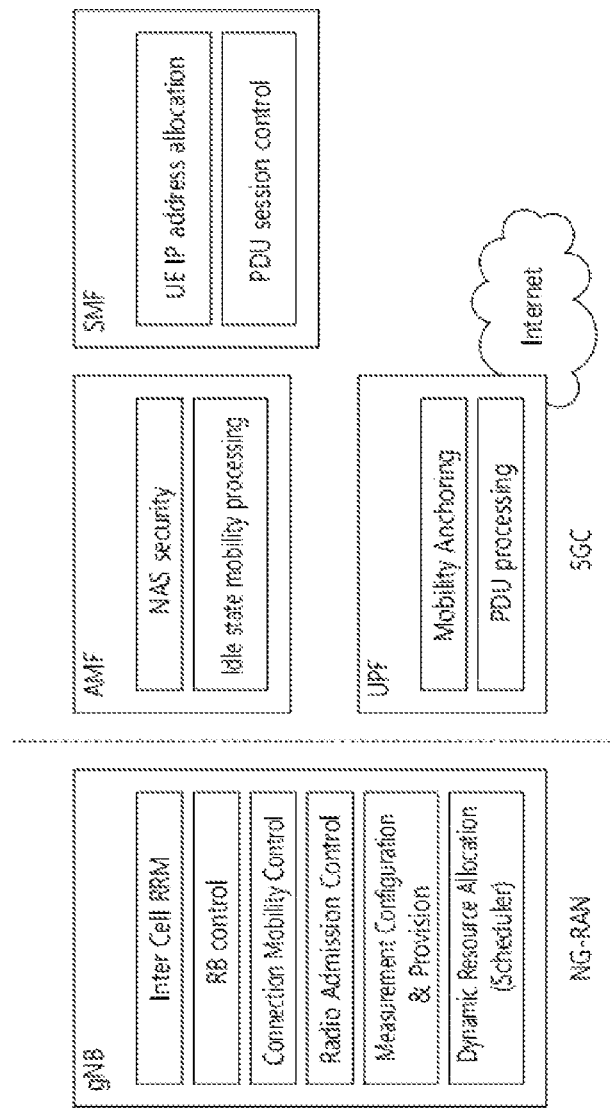
FIG. 5 shows a functional division between an NG-RAN and a 5GC, in accordance with an embodiment of the present disclosure.

FIG. 5 shows a functional division between an NG-RAN and a 5GC, in accordance with an embodiment of the present disclosure.

Referring to FIG. 5, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Figure 6:
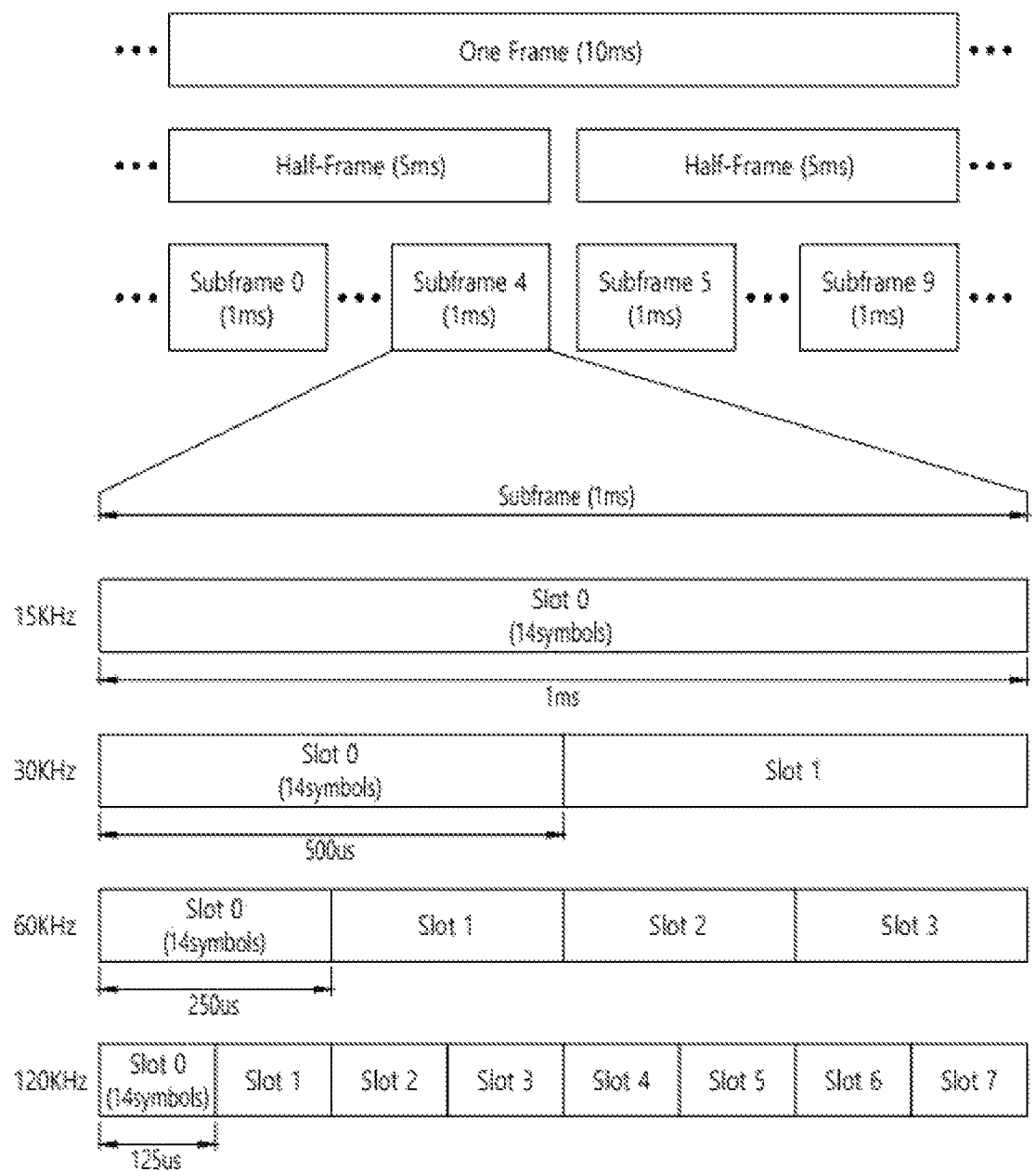
FIG. 6 shows a structure of a radio frame of an NR, in accordance with an embodiment of the present disclosure.

FIG. 6 shows a structure of a radio frame of an NR, in accordance with an embodiment of the present disclosure.

Referring to FIG. 6, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TT) (collectively referred to as a time unit (TU) for simplicity) being configured of the same number of symbols may be differently configured in the integrated cells.

In the NR, multiple numerologies or SCSs for supporting various 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 7:
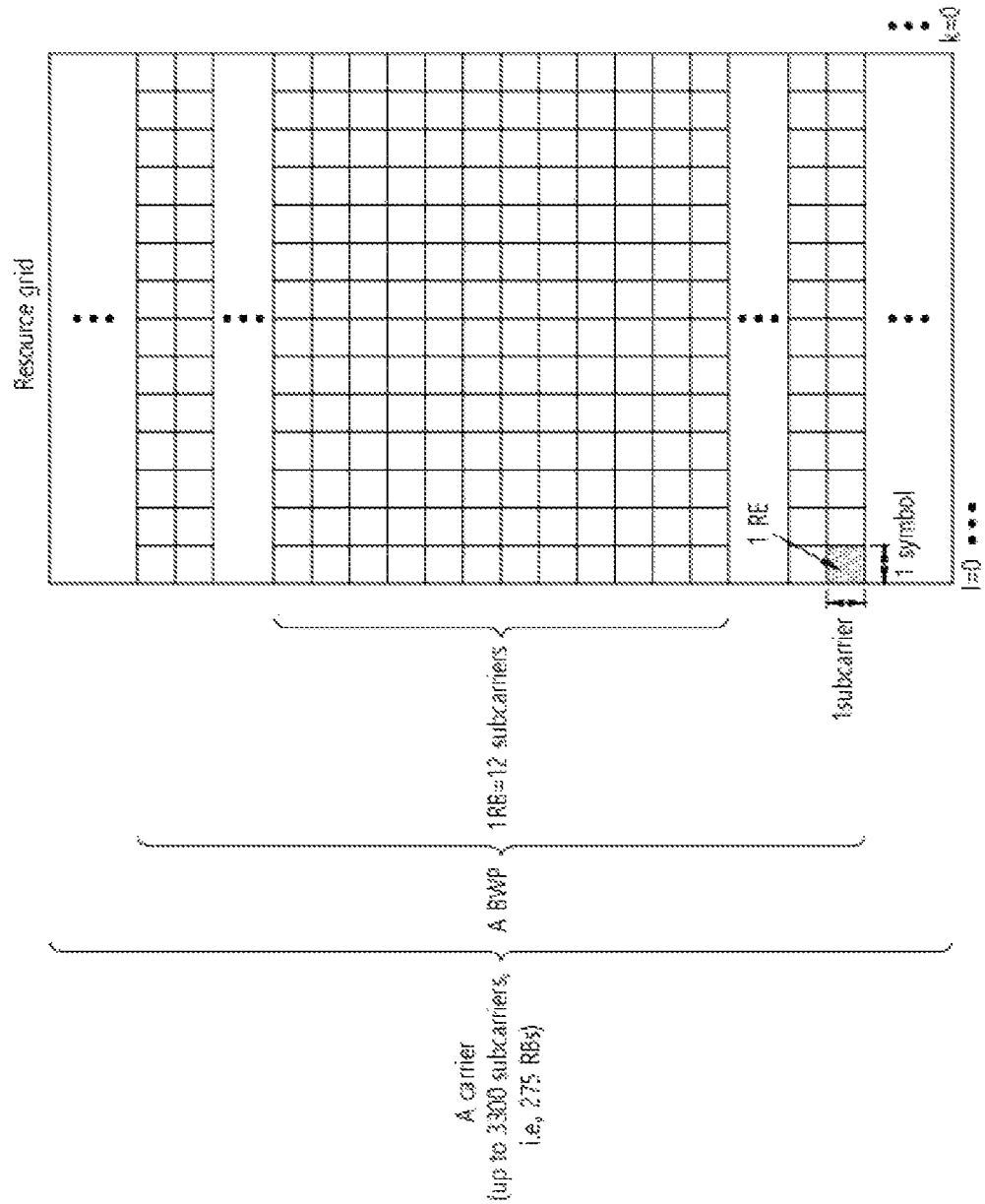
FIG. 7 shows a structure of a slot of an NR frame, in accordance with an embodiment of the present disclosure.

FIG. 7 shows a structure of a slot of an NR frame, in accordance with an embodiment of the present disclosure.

Referring to FIG. 7, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Hereinafter, a Bandwidth Part (BWP) and a carrier will be described in detail.

The Bandwidth Part (BWP) may be a continuous set of physical resource blocks (PRBs) within a given numerology. The PRB may be selected from a continuous partial set of a common resource block (CRB) for a given numerology on a given carrier.

When using Bandwidth Adaptation (BA), a receiving bandwidth and a transmitting bandwidth of a user equipment (UE) are not required to be as wide (or large) as the bandwidth of the cell, and the receiving bandwidth and the transmitting bandwidth of the UE may be controlled (or adjusted). For example, the UE may receive information/configuration for bandwidth control (or adjustment) from a network/base station. In this case, the bandwidth control (or adjustment) may be performed based on the received information/configuration. For example, the bandwidth control (or adjustment) may include reduction/expansion of the bandwidth, position change of the bandwidth, or change in subcarrier spacing of the bandwidth.

For example, the bandwidth may be reduced during a duration with little activity in order to save power. For example, a position of the bandwidth may be relocated (or moved) from a frequency domain. For example, the position of the bandwidth may be relocated (or moved) from a frequency domain in order to enhance scheduling flexibility. For example, subcarrier spacing of the bandwidth may be changed. For example, the subcarrier spacing of the bandwidth may be changed in order to authorize different services. A subset of a total cell bandwidth of a cell may be referred to as a Bandwidth Part (BWP). BA may be performed when a base station/network configures BWPs to the UE, and when the base station/network notifies the BWP that is currently in an active state, among the BWPs, to the UE.

For example, the BWP may be one of an active BWP, an initial BWP, and/or a default BWP. For example, the UE may not monitor a downlink radio link quality in a DL BWP other than the active DL BWP within a primary cell (PCell). For example, the UE may not receive a PDCCH, a PDSCH or a CSI-RS (excluding only the RRM) from outside of the active DL BWP. For example, the UE may not trigger a Channel State Information (CSI) report for an inactive DL BWP. For example, the UE may not transmit a PUCCH or a PUSCH from outside of an inactive DL BWP. For example, in case of a downlink, an initial BWP may be given as a continuous RB set for an RMSI CORESET (that is configured by a PBCH). For example, in case of an uplink, an initial BWP may be given by a SIB for a random access procedure. For example, a default BWP may be configured by a higher layer. For example, an initial value of a default BWP may be an initial DL BWP. For energy saving, if the UE fails to detect DCI during a predetermined period of time, the UE may switch the active BWP of the UE to a default BWP.

Meanwhile, a BWP may be defined for the SL. The same SL BWP may be used for transmission and reception. For example, a transmitting UE may transmit an SL channel or SL signal within a specific BWP, and a receiving UE may receive an SL channel or SL signal within the same specific BWP. In a licensed carrier, the SL BWP may be defined separately from a Uu BWP, and the SL BWP may have a separate configuration signaling from the Uu BWP. For example, the UE may receive a configuration for an SL BWP from the base station/network. The SL BWP may be configured (in advance) for an out-of-coverage NR V2X UE and an RRC_IDLE UE. For a UE operating in the RRC_CONNECTED mode, at least one SL BWP may be activated within a carrier.

Figure 8:
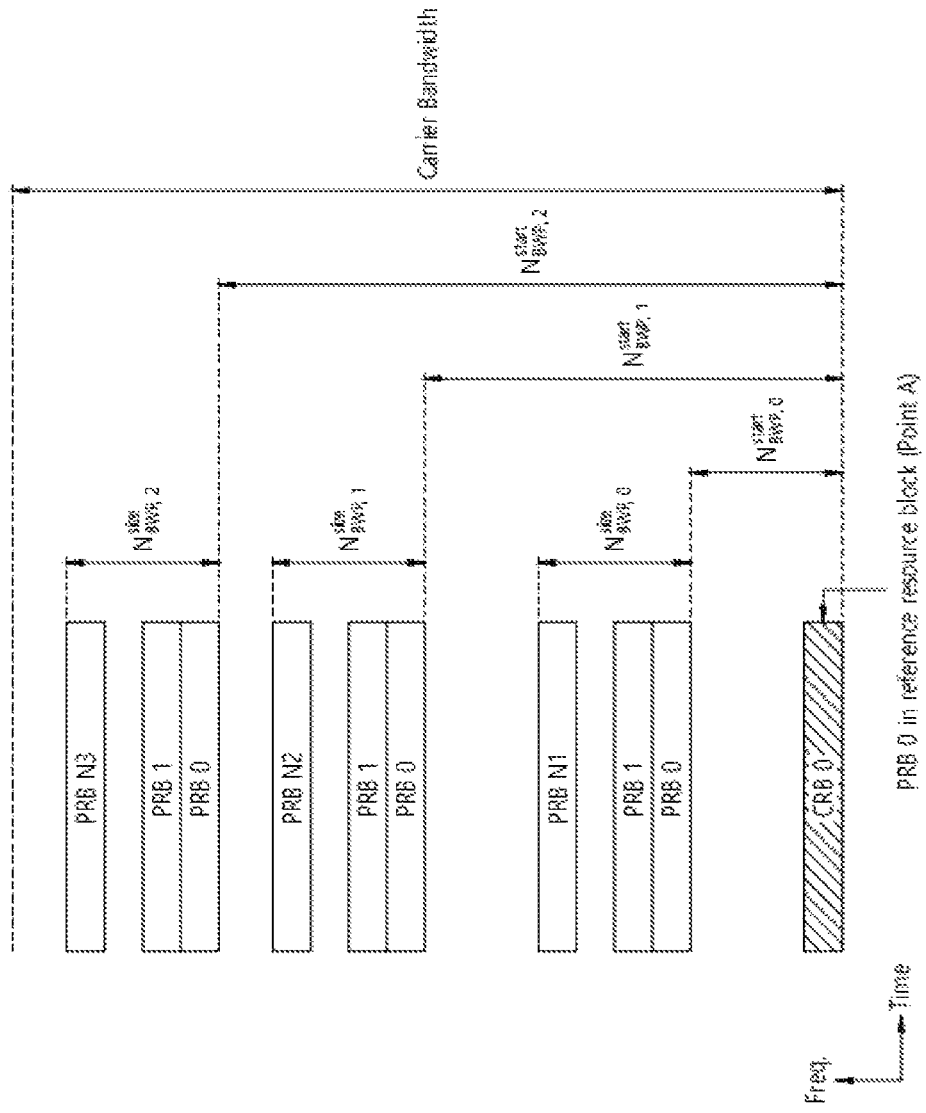
FIG. 8 shows an example of a BWP, in accordance with an embodiment of the present disclosure.

FIG. 8 shows an example of a BWP, in accordance with an embodiment of the present disclosure. In the embodiment of FIG. 8, it is assumed that three BWPs exist.

Referring to FIG. 8, a common resource block (CRB) may be a carrier resource block that is numerated from one end of a carrier band to another end. And, a PRB may be a resource block that is numerated within each BWP. Point A may indicate a common reference point for a resource block grid.

A BWP may be configured by Point A, an offset ($N^{start}_{BWP}$) from Point A, and a bandwidth ($N^{size}_{BWP}$). For example, Point A may be an external reference point of a PRB of a carrier having subcarrier 0 of all numerologies (e.g., all numerologies being supported by the network within the corresponding carrier) aligned therein. For example, the offset may be a PRB distance between a lowest subcarrier within a given numerology and Point A. For example, the bandwidth may be a number of PRBs within the given numerology.

Hereinafter, V2X or SL communication will be described.

Figure 9:
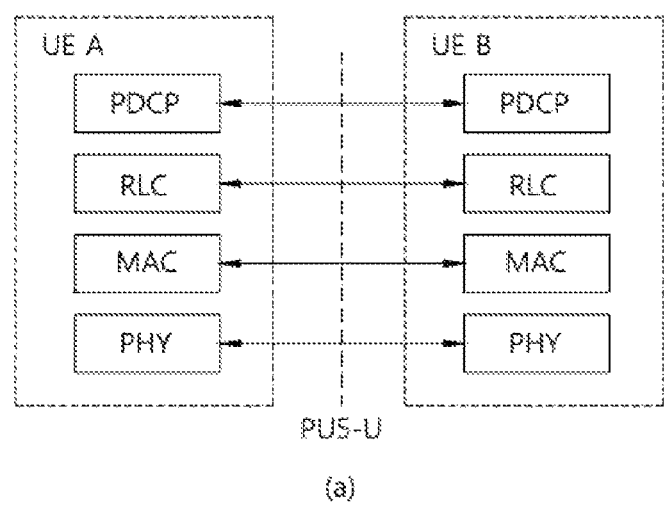
FIG. 9 shows a protocol stack for a SL communication, in accordance with an embodiment of the present disclosure.
Figure 9:
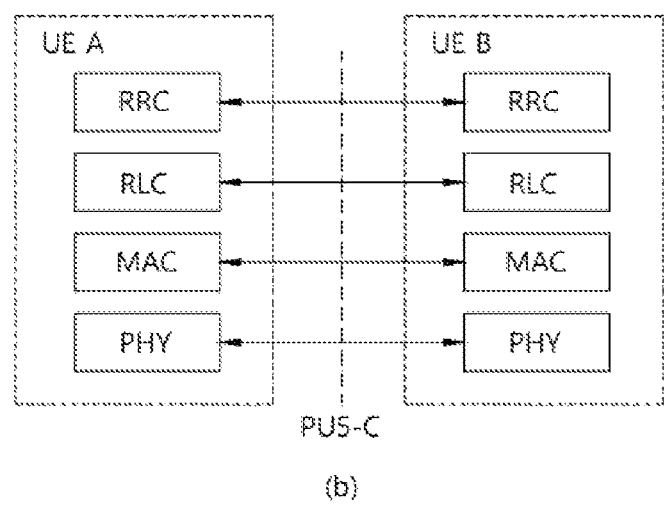

FIG. 9 shows a protocol stack for a SL communication, in accordance with an embodiment of the present disclosure. More specifically, (a) of FIG. 9 shows a user plane protocol stack of LTE, and (b) of FIG. 9 shows a control plane protocol stack of LTE.

Figure 10:
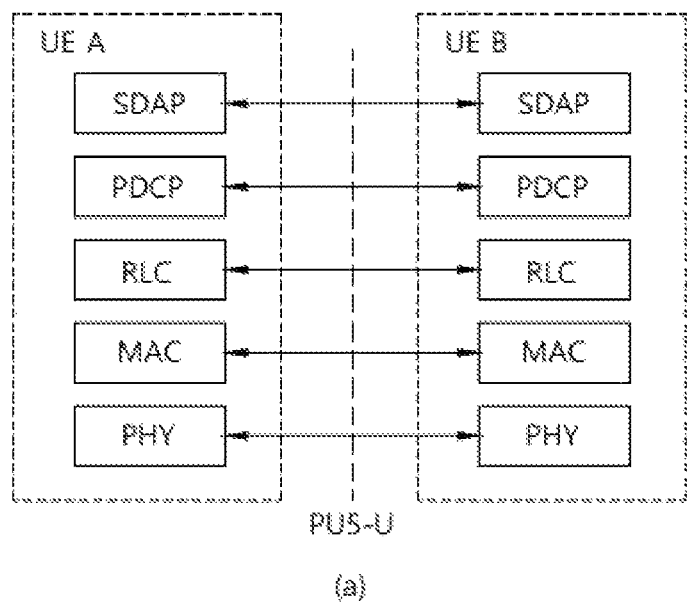
FIG. 10 shows a protocol stack for a SL communication, in accordance with an embodiment of the present disclosure.
Figure 10:
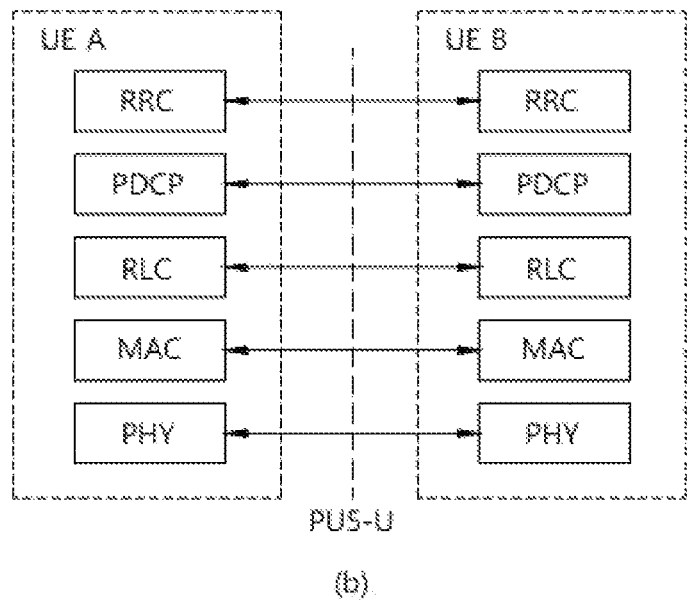

FIG. 10 shows a protocol stack for a SL communication, in accordance with an embodiment of the present disclosure. More specifically, (a) of FIG. 10 shows a user plane protocol stack of NR, and (b) of FIG. 10 shows a control plane protocol stack of NR.

Hereinafter, SL Synchronization Signal (SLSS) and synchronization information will be described.

SLSS is a SL specific sequence, which may include a Primary Sidelink Synchronization Signal (PSSS) and a Secondary Sidelink Synchronization Signal (SSSS). The PSSS may also be referred to as a Sidelink Primary Synchronization Signal (S-PSS), and the SSSS may also be referred to as a Sidelink Secondary Synchronization Signal (S-SSS).

A Physical Sidelink Broadcast Channel (PSBCH) may be a (broadcast) channel through which basic (system) information that should first be known by the user equipment (UE) before transmitting and receiving SL signals. For example, the basic information may be information related to SLSS, a Duplex mode (DM), Time Division Duplex Uplink/Downlink (TDD UL/DL) configuration, information related to a resource pool, application types related to SLSS, a subframe offset, broadcast information, and so on.

The S-PSS, the S-SSS, and the PSBCH may be included in a block format (e.g., a SL SS/PSBCH block, hereinafter referred to as Sidelink-Synchronization Signal Block (S-SSB)). The S-SSB may have the same numerology (i.e., SCS and CP length) as a Physical Sidelink Control Channel (PSCCH)/Physical Sidelink Shared Channel (PSSCH) within the carrier, and a transmission bandwidth may exist within a (pre-)configured SL Bandwidth Part (BWP). And, a frequency position of the S-SSB may be (pre-)configured. Therefore, the UE is not required to perform a hypothesis detection in order to discover the S-SSB in the carrier.

Each SLSS may have a physical layer SL synchronization identity (ID), and the respective value may be equal to any one value ranging from 0 to 335. Depending upon one of the above-described values that is used, a synchronization source may also be identified. For example, values of 0, 168, 169 may indicate global navigation satellite systems (GNSS), values from 1 to 167 may indicate base stations, and values from 170 to 335 may indicate that the source is outside of the coverage. Alternatively, among the physical layer SL synchronization ID values, values 0 to 167 may correspond to value being used by a network, and values from 168 to 335 may correspond to value being used outside of the network coverage.

Figure 11:
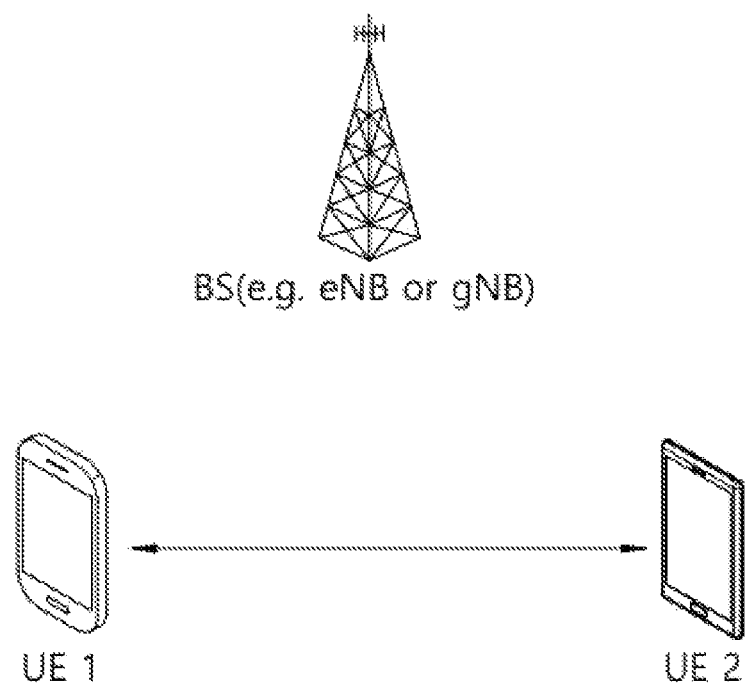
FIG. 11 shows a UE performing V2X or SL communication, in accordance with an embodiment of the present disclosure.

FIG. 11 shows a UE performing V2X or SL communication, in accordance with an embodiment of the present disclosure.

Referring to FIG. 11, in V2X/SL communication, the term terminal may mainly refer to a terminal (or equipment) used by a user. However, in case a network equipment, such as a base station, transmits and receives signals in accordance with a communication scheme between the network equipment and a user equipment (UE) (or terminal), the base station may also be viewed as a type of user equipment (or terminal).

User equipment 1 (UE1) may select a resource unit corresponding to a specific resource within a resource pool, which refers to a set of resources, and UE1 may then be operated so as to transmit a SL signal by using the corresponding resource unit. User equipment 2 (UE2), which is to a receiving UE, may be configured with a resource pool to which UE1 can transmit signals, and may then detect signals of UE1 from the corresponding resource pool.

Herein, in case UE1 is within a connection range of the base station, the base station may notify the resource pool. Conversely, in case UE1 is outside a connection range of the base station, another UE may notify the resource pool or a pre-determined resource may be used.

Generally, a resource pool may be configured in a plurality of resource units, and each UE may select one resource unit or a plurality of resource units and may use the selected resource unit(s) for its SL signal transmission.

Figure 12:
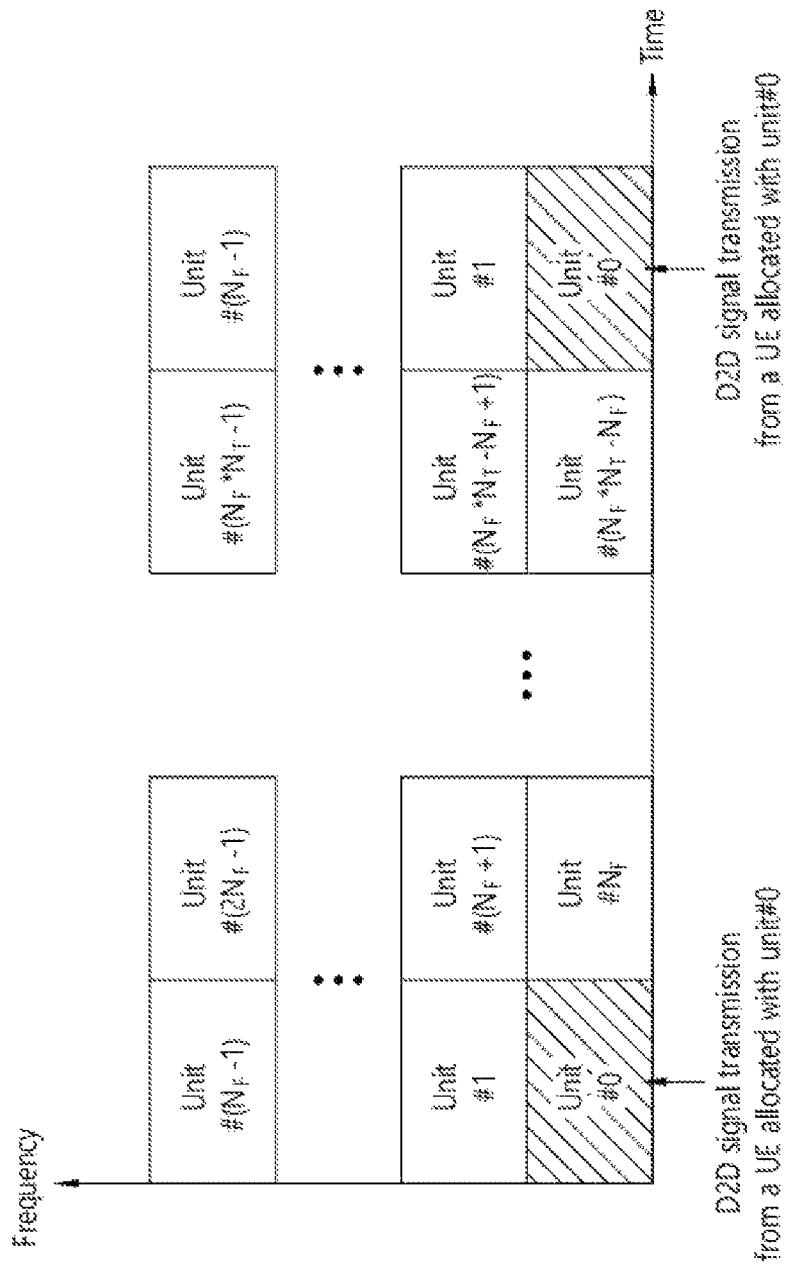
FIG. 12 shows a resource unit for V2X or SL communication, in accordance with an embodiment of the present disclosure.

FIG. 12 shows a resource unit for V2X or SL communication, in accordance with an embodiment of the present disclosure.

Referring to FIG. 12, the total frequency resources of the resource pool may be divided into $N_F$ number of resource units, the total time resources of the resource pool may be divided into $N_T$ number of resource units. Therefore, a total of $N_F * N_T$ number of resource units may be defined in the resource pool. FIG. 12 shows an example of a case where the corresponding resource pool is repeated at a cycle of $N_T$ number of subframes.

As shown in FIG. 12, one resource unit (e.g., Unit #0) may be periodically and repeatedly indicated. Alternatively, in order to achieve a diversity effect in the time or frequency level (or dimension), an index of a physical resource unit to which a logical resource unit is mapped may be changed to a pre-determined pattern in accordance with time. In such resource unit structure, the resource pool may refer to a set of resource units that can be used for a transmission that is performed by a user equipment (UE), which intends to transmit SL signals.

The resource pool may be segmented to multiple types. For example, depending upon the content of a SL signal being transmitted from each resource pool, the resource pool may be divided as described below.

(1) Scheduling Assignment (SA) may correspond to a signal including information, such as a position of a resource that is used for the transmission of a SL data channel, a Modulation and Coding Scheme (MCS) or Multiple Input Multiple Output (MIMO) transmission scheme needed for the modulation of other data channels, a Timing Advance (TA), and so on. The SA may also be multiplexed with SL data within the same resource unit and may then be transmitted, and, in this case, an SA resource pool may refer to a resource pool in which the SA is multiplexed with the SL data and then transmitted. The SA may also be referred to as a SL control channel.

(2) A Physical Sidelink Shared Channel (PSSCH) may be a resource pool that is used by a transmitting UE for transmitting user data. If the SA is multiplexed with SL data within the same resource unit and then transmitted, only a SL data channel excluding the SA information may be transmitted from the resource pool that is configured for the SL data channel. In other words, REs that were used for transmitting SA information within a separate resource unit of the SA resource pool may still be used for transmitting SL data from the resource pool of a SL data channel.

(3) A discovery channel may be a resource pool that is used by the transmitting UE for transmitting information, such as its own ID. By doing so, the transmitting UE may allow a neighboring UE to discover the transmitting UE.

Even if the content of the above-described SL signal is the same, different resource pools may be used depending upon the transmission/reception attribute of the SL signal. For example, even if the same SL data channel or discovery message is used, the resource pool may be identified as a different resource pool depending upon a transmission timing decision method (e.g., whether the transmission is performed at a reception point of the synchronization reference signal or whether transmission is performed at the reception point by applying a consistent timing advance), a resource allocation method (e.g., whether the base station designates a transmission resource of a separate signal to a separate transmitting UE or whether a separate transmitting UE selects a separate signal transmission resource on its own from the resource pool), and a signal format (e.g., a number of symbols occupied by each SL signal within a subframe or a number of subframes being used for the transmission of one SL signal) of the SL signal, signal intensity from the base station, a transmitting power intensity (or level) of a SL UE, and so on.

Hereinafter, resource allocation in a SL will be described.

Figure 13:
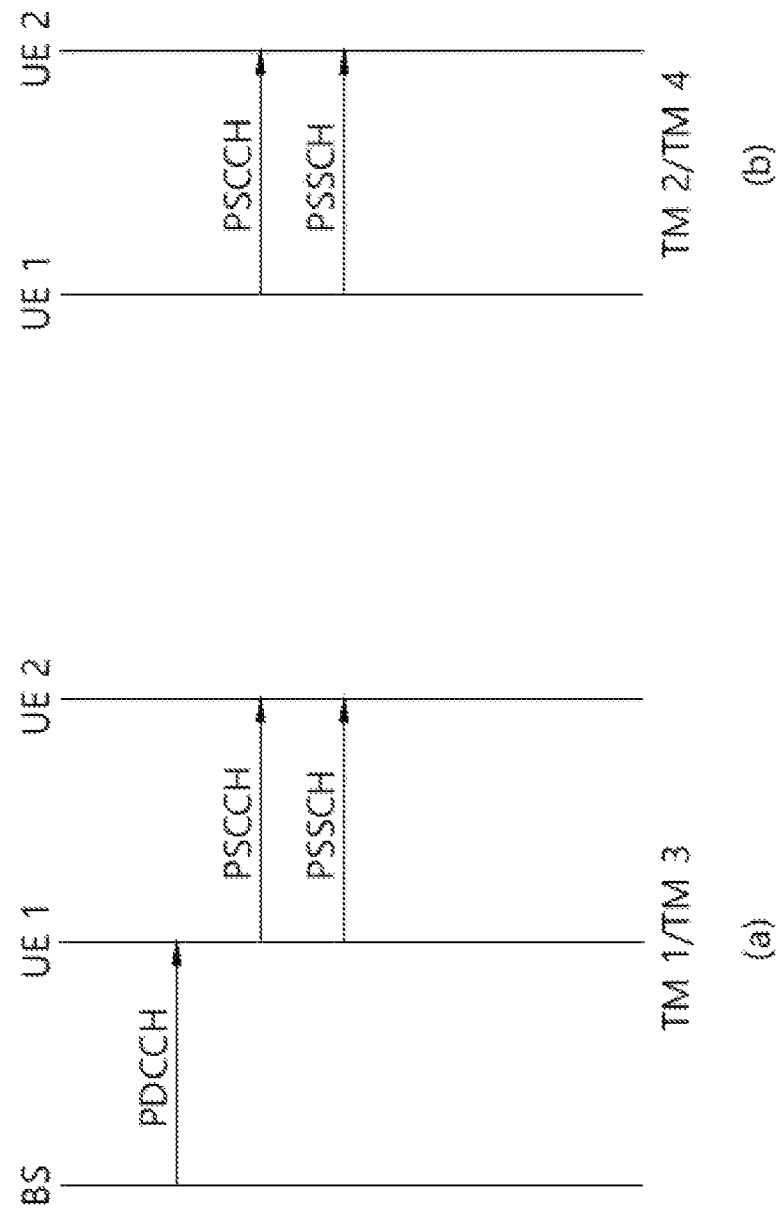
FIG. 13 shows procedures of a UE performing V2X or SL communication according to a transmission mode (TM), in accordance with an embodiment of the present disclosure.

FIG. 13 shows procedures of a UE performing V2X or SL communication according to a transmission mode (TM), in accordance with an embodiment of the present disclosure. Specifically, (a) of FIG. 13 shows a UE operation related to a transmission mode 1 or a transmission mode 3, and (b) of FIG. 13 shows a UE operation related to a transmission mode 2 or a transmission mode 4.

Referring to (a) of FIG. 13, in transmission modes 1/3, the base station performs resource scheduling to UE1 via PDCCH (more specifically, Downlink Control Information (DCI)), and UE1 performs SL/V2X communication with UE2 according to the corresponding resource scheduling. After transmitting sidelink control information (SCI) to UE2 via physical sidelink control channel (PSCCH), UE1 may transmit data based on the SCI via physical sidelink shared channel (PSSCH). In case of an LTE SL, transmission mode 1 may be applied to a general SL communication, and transmission mode 3 may be applied to a V2X SL communication.

Referring to (b) of FIG. 13, in transmission modes 2/4, the UE may schedule resources on its own. More specifically, in case of LTE SL, transmission mode 2 may be applied to a general SL communication, and the UE may select a resource from a predetermined resource pool on its own and may then perform SL operations. Transmission mode 4 may be applied to a V2X SL communication, and the UE may carry out a sensing/SA decoding procedure, and so on, and select a resource within a selection window on its own and may then perform V2X SL operations. After transmitting the SCI to UE2 via PSCCH, UE1 may transmit SCI-based data via PSSCH. Hereinafter, the transmission mode may be abbreviated to the term mode.

In case of NR SL, at least two types of SL resource allocation modes may be defined. In case of mode 1, the base station may schedule SL resources that are to be used for SL transmission. In case of mode 2, the user equipment (UE) may determine a SL transmission resource from SL resources that are configured by the base station/network or predetermined SL resources. The configured SL resources or the pre-determined SL resources may be a resource pool. For example, in case of mode 2, the UE may autonomously select a SL resource for transmission. For example, in case of mode 2, the UE may assist (or help) SL resource selection of another UE. For example, in case of mode 2, the UE may be configured with an NR configured grant for SL transmission. For example, in case of mode 2, the UE may schedule SL transmission of another UE. And, mode 2 may at least support reservation of SL resources for blind retransmission.

Procedures related to sensing and resource (re-)selection may be supported in resource allocation mode 2. The sensing procedure may be defined as a process decoding the SCI from another UE and/or SL measurement. The decoding of the SCI in the sensing procedure may at least provide information on a SL resource that is being indicated by a UE transmitting the SCI. When the corresponding SCI is decoded, the sensing procedure may use L1 SL Reference Signal Received Power (RSRP) measurement, which is based on SL Demodulation Reference Signal (DMRS). The resource (re-)selection procedure may use a result of the sensing procedure in order to determine the resource for the SL transmission.

Figure 14:
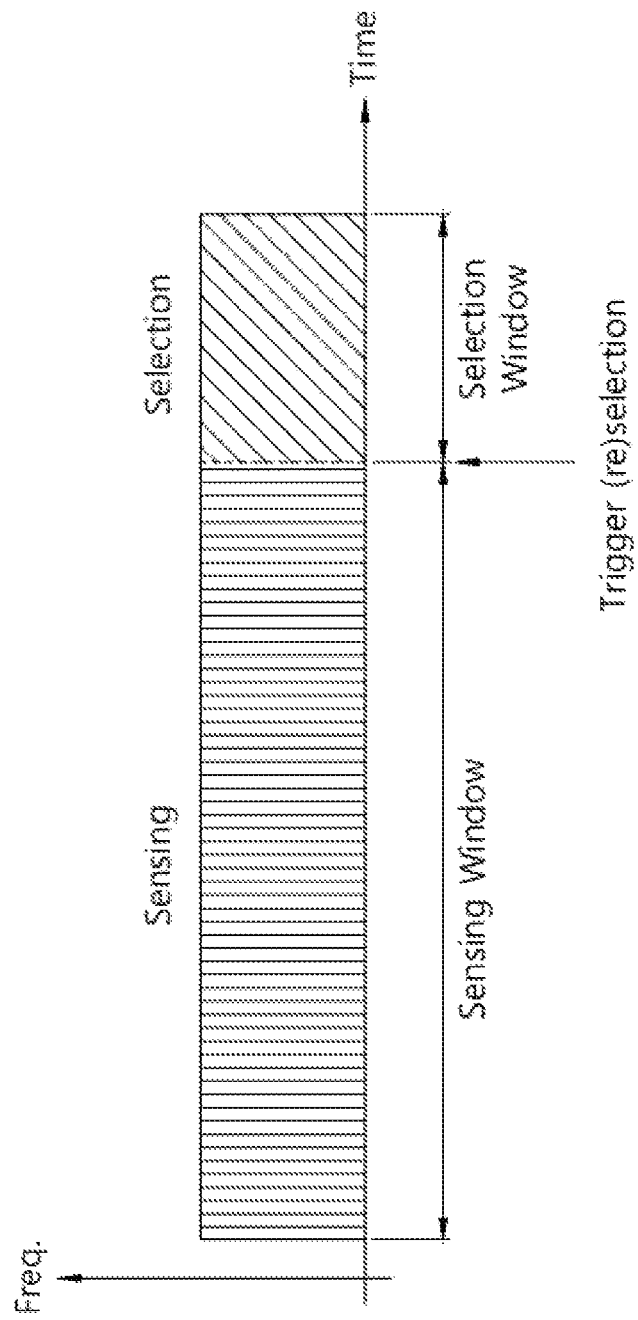
FIG. 14 shows a method of selecting a transmission resource by a UE, in accordance with an embodiment of the present disclosure.

FIG. 14 shows a method of selecting a transmission resource by a UE, in accordance with an embodiment of the present disclosure.

Referring to FIG. 14, the UE may identify transmission resources reserved by another UE or resources being used by another UE via sensing within a sensing window, and, after excluding the identified resources from a selection window, the UE may randomly select a resource from resources having low interference among the remaining resources.

For example, within the sensing window, the UE may decode the PSCCH including information on the cycles of the reserved resources, and, then, the UE may measure a PSSCH RSRP from resources that are periodically determined based on the PSCCH. The UE may exclude resources having the PSSCH RSRP that exceeds a threshold value from the selection window. Thereafter, the UE may randomly select a SL resource from the remaining resources within the selection window.

Alternatively, the UE may measure a Received Signal Strength Indicator (RSSI) of the periodic resources within the sensing window and may then determine the resources having low interference (e.g., the lower 20% of the resources). Additionally, the UE may also randomly select a SL resource from the resources included in the selection window among the periodic resources. For example, in case the UE fails to perform decoding of the PSCCH, the UE may use the above described methods.

Hereinafter, synchronization acquisition of an SL UE will be described.

In time division multiple access (TDMA) and frequency division multiple access (FDMA) systems, accurate time and frequency synchronization is essential. If the time and frequency synchronization is not accurate, system performance may be degraded due to inter symbol interference (ISI) and inter carrier interference (ICI). The same is true for V2X. In V2X, for time/frequency synchronization, sidelink synchronization signal (SLSS) may be used in a physical layer, and master information block-sidelink-V2X (MIB-SL-V2X) may be used in a radio link control (RLC) layer.

Figure 15:
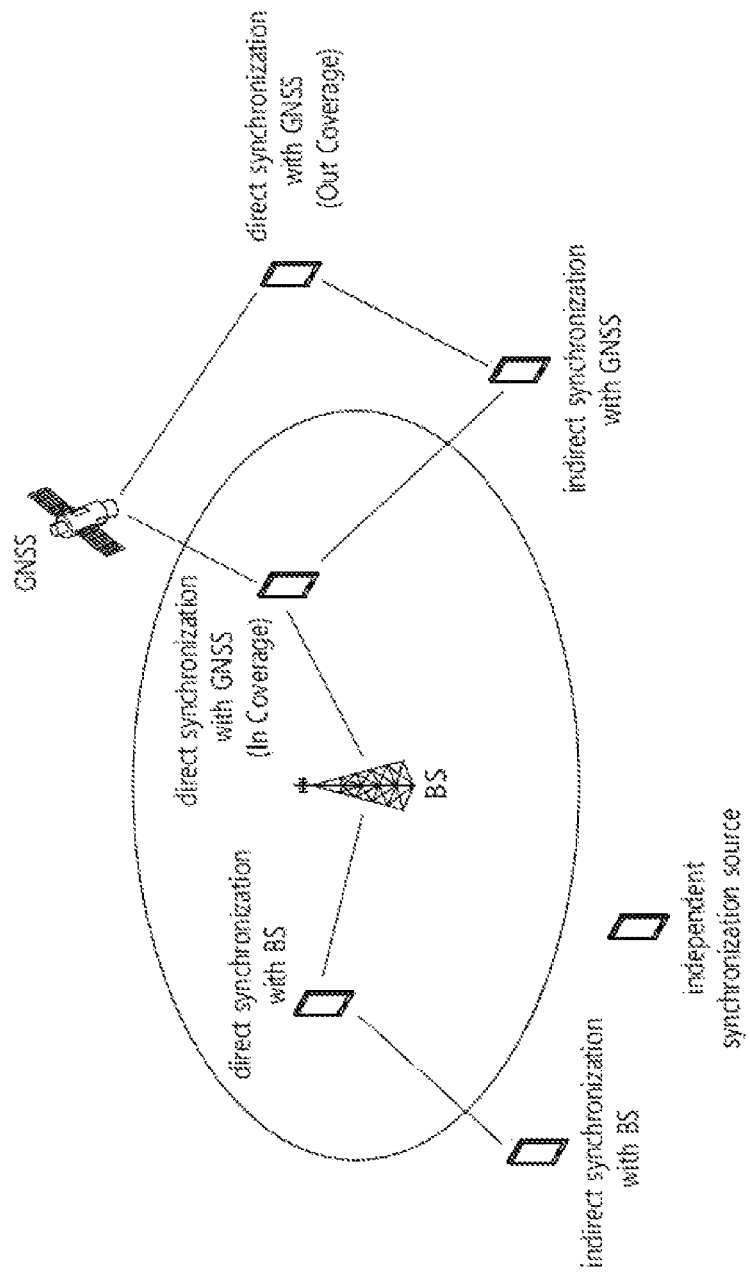
FIG. 15 shows a synchronization source or synchronization reference of V2X, in accordance with an embodiment of the present disclosure.

FIG. 15 shows a synchronization source or synchronization reference of V2X, in accordance with an embodiment of the present disclosure.

Referring to FIG. 15, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 5. Table 5 is for exemplary purposes only, and the relation between the synchronization source and the synchronization priority may be defined in various forms.

TABLE 5

| Priority level | GNSS-based synchronization | eNB/gNB-based synchronization |
| --- | --- | --- |
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

Whether to use GNSS-based synchronization or BS-based synchronization may be (pre-)configured. In a single-carrier operation, the UE may derive transmission timing of the UE from an available synchronization reference having the highest priority.

Hereinafter, sidelink (SL) congestion control will be described.

If a UE autonomously determines an SL transmission resource, the UE also autonomously determines a size and frequency of use for a resource used by the UE. Of course, due to a constraint from a network or the like, it may be restricted to use a resource size or frequency of use, which is greater than or equal to a specific level. However, if all UEs use a relatively great amount of resources in a situation where many UEs are concentrated in a specific region at a specific time, overall performance may significantly deteriorate due to mutual interference.

Accordingly, the UE may need to observe a channel situation. If it is determined that an excessively great amount of resources are consumed, it is preferable that the UE autonomously decreases the use of resources. In the present specification, this may be defined as congestion control (CR). For example, the UE may determine whether energy measured in a unit time/frequency resource is greater than or equal to a specific level, and may adjust an amount and frequency of use for its transmission resource based on a ratio of the unit time/frequency resource in which the energy greater than or equal to the specific level is observed. In the present specification, the ratio of the time/frequency resource in which the energy greater than or equal to the specific level is observed may be defined as a channel busy ratio (CBR). The UE may measure the CBR for a channel/frequency. Additionally, the UE may transmit the measured CBR to the network/BS.

Figure 16:
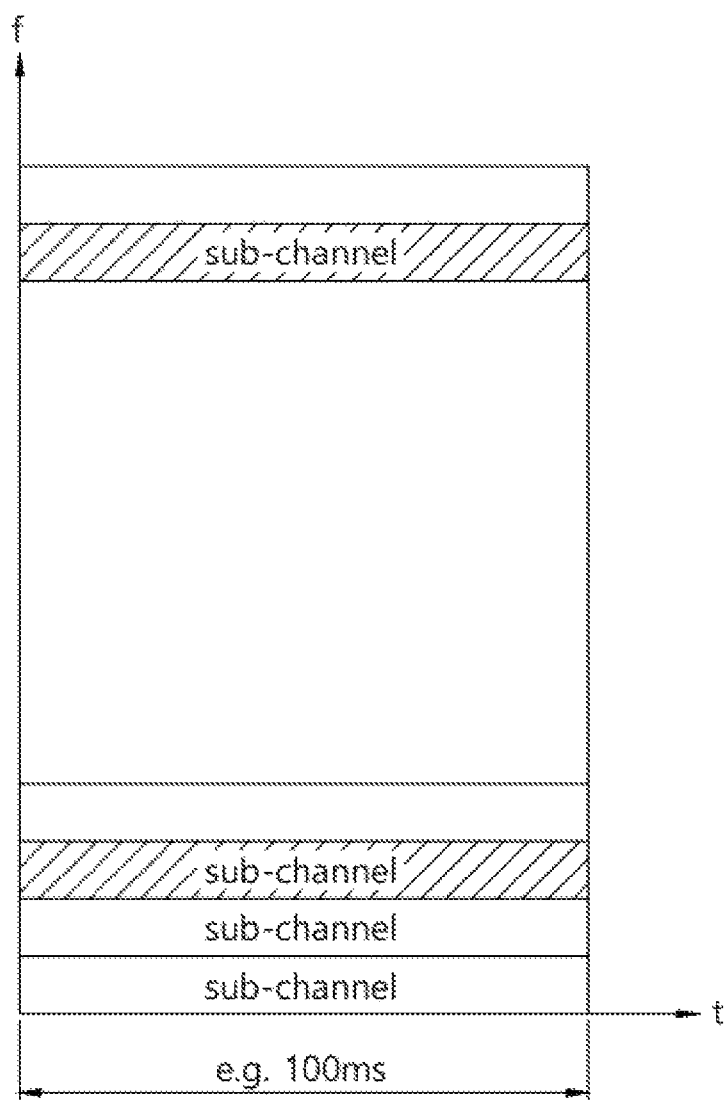
FIG. 16 shows a method for measuring, by a UE, a channel busy ratio (CBR), in accordance with an embodiment of the present disclosure.

FIG. 16 shows a method for measuring, by a UE, a channel busy ratio (CBR), in accordance with an embodiment of the present disclosure.

Referring to FIG. 16, CBR may denote the number of sub-channels in which a measurement result value of a received signal strength indicator (RSSI) has a value greater than or equal to a pre-configured threshold as a result of measuring the RSSI by a UE on a sub-channel basis for 100 ms. Alternatively, the CBR may denote a ratio of sub-channels having a value greater than or equal to a pre-configured threshold among sub-channels for a specific duration. For example, in the embodiment of FIG. 16, if it is assumed that a hatched sub-channel is a sub-channel having a value greater than or equal to a pre-configured threshold, the CBR may denote a ratio of the hatched sub-channels for a period of 100 ms.

Further, congestion control considering the priority of traffic (e.g., packets) may be required. Specifically, each UE measures a CBR and determines a maximum value CRlimitk of a channel occupancy ratio k (CRk) which may be occupied by each traffic priority (e.g., k). For example, a UE may derive a maximum CRlimitk of a channel occupancy ratio for the priority of each traffic based on a CBR measurement value and a predetermined table. In the case of traffic having relatively high priority, a larger maximum value of a channel occupancy ratio may be derived. Thereafter, the UE may perform congestion control by limiting a sum of the channel occupancy ratios of traffics with lower priorities k than i to a certain value or less. According to this method, a stronger channel occupancy ratio limit may be imposed on traffics with relatively low priorities.

In addition thereto, the UE may perform SL congestion control by using a method of adjusting a level of transmit power, dropping a packet, determining whether retransmission is to be performed, adjusting a transmission RB size (MCS coordination), or the like.

Meanwhile, there may be a need for an efficient coexistence method considering transmit power distribution, synchronization, time synchronization, half-duplex problems, service priority, and/or service type, when a UE performs SL communication based different RATs (e.g., NR and LTE) over different channels. In addition, there may be a need for an efficient coexistence method considering transmit power distribution, synchronization, time synchronization, half-duplex problems, service priority, and/or service type, when a UE performs SL communication based different RATs (e.g., NR and LTE) over the same channel. For example, the coexistence may be in-device coexistence. For example, different channels may be continuous different channels within an intra-band. For example, different channels may be discontinuous different channels within an intra-band. For example, different channels may be different channels over an inter-band.

Hereinafter, a method of enabling different RATs to efficiently coexist when a UE performs SL communication based over different RATs over different channels or the same channel according to an embodiment of the present disclosure, and an apparatus supporting the same will be described.

In the present disclosure, for convenience of description, sidelink transmission related to LTE or sidelink transmission based on LTE may be referred to as LTE SL transmission, and sidelink transmission related to NR or sidelink transmission based on NR may be referred to as NR SL transmission.

In the present disclosure, sidelink RSSI (S-RSSI) may be defined as the linear average of the total received power (in [W]) per SC-FDMA symbol observed by the UE only in the configured sub-channel in SC-FDMA symbols 1, 2, . . . , 6 of the first slot and SC-FDMA symbols 0, 1, . . . , 5 of the second slot of a subframe. In the present disclosure, PSSCH Reference Signal Received Power (PSSCH-RSRP) may be defined as the linear average over the power contributions (in [W]) of the resource elements that carry demodulation reference signals associated with PSSCH, within the PRBs indicated by the associated PSCCH).

In the present disclosure, reception operation of a UE may include decoding operation and/or reception operation of a sidelink channel and/or a sidelink signal (e.g., PSCCH, PSSCH, PSFCH, PSBCH, PSSS/SSSS, etc.). Reception operation of a UE may include decoding operation and/or reception operation of a WAN DL channel and/or a WAN DL signal (e.g., PDCCH, PDSCH, PSS/SSS, etc.). The reception operation of a UE may include sensing operation and/or CBR measurement operation. In the present disclosure, the sensing operation of a UE may include PSSCH-RSRP measurement operation based on a PSSCH DM-RS sequence, PSSCH-RSRP measurement operation based on a PSSCH DM-RS sequence scheduled by a PSCCH successfully decoded by a UE, sidelink RSSI (S-RSSI) measurement operation and/or S-RSSI measurement based on a V2X resource pool associated subchannel. In the present disclosure, transmission operation of a UE may include transmission operation of a sidelink channel and/or a sidelink signal (e.g., PSCCH, PSSCH, PSFCH, PSBCH, PSSS/SSSS, etc.). Transmission operation of a UE may include transmission operation of a WAN UL channel and/or a WAN UL signal (e.g., PUSCH, PUCCH, SRS, etc.). In the present disclosure, a synchronization signal may include an SLSS and/or a PSBCH.

In the present disclosure, configuration may include signaling, signaling from a network, configuration from a network and/or preconfiguration from a network. In the present disclosure, definition may include signaling, signaling from a network, configuration from a network and/or preconfiguration from a network. In the present disclosure, designation may include signaling, signaling from a network, configuration from a network and/or preconfiguration from a network. In the present disclosure, PPPP may be replaced by PPPR and PPPR may be replaced by PPPP. In the present disclosure, a smaller PPPP value may mean higher priority and a larger PPPP value may mean lower priority. In the present disclosure, a smaller PPPR value may mean high reliability and a larger PPPR value may mean low reliability. For example, a PPPP value associated with a service, packet or message associated with high priority may be less than a PPPP value associated with a service, packet or message associated with low priority. For example, a PPPR value associated with a service, packet or message associated with high reliability may be less than a PPPR value associated with a service, packet or message associated with low reliability.

In the present disclosure, a channel may be interpreted as being extended to at least one of a carrier, a BWP and/or a resource pool. For example, a channel may include at least one of a carrier, a BWP and/or a resource pool. For example, a carrier may include at least one of a channel, a BWP and/or a resource pool. For example, a carrier may include one or more BWPs. For example, a BWP may include one or more resource pools.

For example, within a BWP or an active BWP, a plurality of beam search resources or beam measurement resources may be configured in the form of FDM. For example, this may be to reduce a time required for beam search or beam measurement. For example, between different beams, some or all of transmission resources associated with an SL synchronization signal and a PSBCH may be configured in the form of TDM. For example, this may be to avoid a power-limited case.

Some or all of the methods proposed in the present disclosure may be limited to transmission operation of a UE, transmission carrier selection operation and/or transmission BWP selection operation. Alternatively, for example, some or all of the methods proposed in the present disclosure may be limited to reception operation of a UE, reception carrier selection operation and/or reception BWP selection operation.

At least one of the methods proposed in the present disclosure is applicable not only to sidelink communication or V2X communication based on PC5 interface or SL interface (e.g., PSCCH, PSSCH, PSBCH, PSSS/SSSS, etc.) but also to a sidelink communication or V2X communication based on Uu interface (e.g., PUSCH, PDSCH, PDCCH, PUCCH, etc.).

At least one of the methods proposed in the present disclosure is limitedly applicable to the case where LTE SL transmission and NR SL transmission are performed through different (continuous or discontinuous) channels within an intra-band. Alternatively, at least one of the methods proposed in the present disclosure is limitedly applicable to the case where LTE SL transmission and NR SL transmission are performed through different channels over an inter-band.

According to an embodiment of the present disclosure, when NR SL transmission and LTE SL transmission over different channels partially or entirely overlap in the time domain and a sum of transmit power required for NR SL transmission and LTE SL transmission exceeds maximum transmit power (hereinafter referred to as P_MAX) of a UE and/or NR SL transmission and LTE SL transmission partially or entirely overlapping in the time domain exceeds (RF) capability (e.g., the number of provided TX chains, etc.), the UE may distribute P_MAX according to some or all of the following rules. For example, P_MAX may be distributed between NR_SL transmission and LTR_SL transmission. Alternatively, according to some or all of the following rules, until P_MAX is not exceeded, a UE may reduce transmit power associated with transmission of relatively low priority. Alternatively, according to some or all of the following rules, a UE may omit transmission of relatively low priority. For example, NR SL transmission and LTE SL transmission over different channels partially or entirely overlap in the time domain, a UE may omit transmission of relatively low priority. Here, for example, transmit power reduction operation, transmit power distribution operation and/or transmission omission operation are not applicable to some symbols of an SL transmission signal and/or an SL transmission channel, but are applicable to all (symbols). The rules described below may be combined with each other.

1) First Rule

For example, LTE SL transmission may be configured to have relatively high priority. Alternatively, for example, NR SL transmission may be configured to have relatively high priority. Alternatively, for example, a power distribution ratio of LTE SL transmission and NR SL transmission may be configured in advance for a UE.

2) Second Rule

For example, transmission of a message associated with a relatively low PPPP value may be configured to have relatively high priority. Alternatively, for example, transmission of a message associated with a relatively high PPPP value may be configured to have relatively high priority. Alternatively, for example, transmission of a message associated with a relatively low PPPR value may be configured to have relatively high priority. Alternatively, for example, transmission of a message associated with a relatively high PPPR value may be configured to have relatively high priority. Alternatively, for example, transmission of a service (type) associated message with relatively high priority may be configured to have relatively high priority. For example, a message associated with public safety may be configured to have higher priority than a commercial message or a message associated with non-public safety. For example, a unicast message may be configured to have higher priority than a broadcast message or a groupcast message. Alternatively, for example, transmission of a service (type) associated message with relatively low priority may be configured to have relatively high priority. For example, a message associated with public safety may be configured to have lower priority than a commercial message or a message associated with non-public safety. For example, a unicast message may be configured to have lower priority than a broadcast message or a groupcast message. Alternatively, for example, transmission of a generation type with relatively high priority may be configured to have relatively high priority. Alternatively, for example, transmission of a generation type with relatively low priority may be configured to have relatively high priority. For example, an aperiodic message (for example, an aperiodically generated message) may be configured to have higher priority than a periodic message (for example, a peridically generated message). For example, an aperiodic message may be configured to have lower priority than a periodic message. Alternatively, for example, transmission of a message with relatively short delay requirements may be configured to have relatively high priority. Alternatively, for example, transmission of a message with relatively long delay requirements may be configured to have relatively high priority. Alternatively, for example, transmission of a message with relatively high reliability requirements may be configured to have relatively high priority. Alternatively, for example, transmission of a message with relatively low reliability requirements may be configured to have relatively high priority.

3) Third Rule

For example, transmission of a message with relatively high power requirements may be configured to have relatively high priority. Alternatively, for example, transmission of a message with relatively low power requirements may be configured to have relatively high priority. Alternatively, for example, transmission of a randomly selected message may be configured to have relatively high priority. Alternatively, for example, transmission of a message over a primary channel may be configured to have relatively high priority. Alternatively, for example, transmission of a message over a secondary channel may be configured to have relatively high priority. Alternatively, for example, transmission of a message over a channel belonging to a master cell group (MCG) may be configured to have relatively high priority. Alternatively, for example, transmission of a message over a channel belonging to a secondary cell group (SCG) may be configured to have relatively high priority. Alternatively, for example, transmission of a message over a channel having a relatively small CBR value may be configured to have relatively high priority. Alternatively, for example, transmission of a message over a channel having a relatively large CBR value may be configured to have relatively high priority. Alternatively, for example, transmission of a message over a channel having a relatively small CR value may be configured to have relatively high priority. Alternatively, for example, transmission of a message over a channel having a relatively large CR value may be configured to have relatively high priority. Alternatively, for example, transmission of a message over a channel with a larger CR value remaining for CR_LIMIT may be configured to have relatively high priority. Alternatively, for example, transmission of a message over a channel with a smaller CR value remaining for CR_LIMIT may be configured to have relatively high priority. Alternatively, for example, transmission of a message based on resource a relatively long period may be configured to have relatively high priority. Alternatively, for example, transmission of a message based on resource a relatively short period may be configured to have relatively high priority. Alternatively, for example, transmission of a message based on resources consisting of a relatively small number of symbols may be configured to have relatively high priority. Alternatively, for example, transmission of a message based on resources consisting of a relatively large number of symbols may be configured to have relatively high priority. Alternatively, for example, transmission of a message over a channel configured with a relatively small subcarrier spacing value may be configured to have relatively high priority. Alternatively, for example, transmission of a message over a channel configured with a relatively large subcarrier spacing value may be configured to have relatively high priority. Alternatively, for example, transmission of a message over a channel configured with a relatively long CP length may be configured to have relatively high priority. Alternatively, for example, transmission of a message over a channel configured with a relatively short CP length may be configured to have relatively high priority. Alternatively, for example, transmission of a message over a channel with a relatively low index may be configured to have relatively high priority. Alternatively, for example, transmission of a message over a channel with a relatively high index may be configured to have relatively high priority. Alternatively, for example, transmission of preset signals, channels and/or information (for example, PSSS/SSSS, PSBCH, HAQR-ACK feedback, (channel status information and/or link quality) measurement report) may be configured to have relatively high priority. Alternatively, for example, transmission of signals, channels and/or information with high priority set in advance may be configured to have relatively high priority. Alternatively, for example, transmission of signals, channels and/or information with low priority set in advance may be configured to have relatively high priority. Alternatively, for example, transmission of a message based on resource allocation mode 1 may be configured to have relatively high priority. Alternatively, for example, transmission of a message based on resource allocation mode 2 may be configured to have relatively high priority.

For example, when LTE SL transmission and NR SL transmission have the same priority according to the second rule, a UE may determine transmission to reduce power or transmission to be omitted until P_MAX is not exceeded based on the third rule. Alternatively, for example, when LTE SL transmission and NR SL transmission are associated with the same PPPP value or the same PPPR value according to the second rule, a UE may determine transmission to reduce power or transmission to be omitted until P_MAX is not exceeded based on the third rule. Alternatively, for example, when LTE SL transmission and NR SL transmission are associated with the same delay requirements or the same reliability requirements according to the second rule, a UE may determine transmission to reduce power or transmission to be omitted until P_MAX is not exceeded based on the third rule.

For example, at least one of transmission of S-SSB (for example, PSSS, SSSS and PBCH), transmission of SL HAQR-ACK feedback, transmission of SL CSI (channel state information), transmission of (L1) SL RSRP, transmission of SL RSSI and/or transmission of SL CSI-RS may be assumed to have priority set in advance. Alternatively, for example, at least one of transmission of S-SSB, transmission of SL HAQR-ACK feedback, transmission of SL CSI, transmission of (L1) SL RSRP, transmission of SL RSSI and/or transmission of SL CSI-RS may be assumed to have priority associated with associated services/packets and/or PSCCH/PSSCH. For example, at least one of transmission of S-SSB, transmission of SL HAQR-ACK feedback, transmission of SL CSI, transmission of (L1) SL RSRP, transmission of SL RSSI and/or transmission of SL CSI-RS may be assumed to have highest priority associated with associated services/packets and/or PSCCH/PSSCH. For example, at least one of transmission of S-SSB, transmission of SL HAQR-ACK feedback, transmission of SL CSI, transmission of (L1) SL RSRP, transmission of SL RSSI and/or transmission of SL CSI-RS may be assumed to have lowest priority associated with associated services/packets and/or PSCCH/PSSCH.

According to an embodiment of the present disclosure, a maximum allowable transmit power value which may be used for LTE SL transmission and NR SL transmission may be set in advance for a UE or may be configured in advance. In the present disclosure, for convenience of description, a maximum allowable transmit power value which may be used for LTE SL transmission may be referred to as MAX_PLT, and a maximum allowable transmit power value which may be used for NR SL transmission may be referred to as MAX_PNR. For example, MAX_PLT may be set for channels and/or carriers associated with LTE SL transmission, and MAX_PNR may be set for channels and/or carriers associated with NR SL transmission. For example, channels and/or carriers over which LTE SL transmission is performed may be different from channels and/or carriers over which NR SL transmission is performed. For example, if such rules are applied, when required power of LTE SL transmission exceeds MAX_PLT, the (required) power of LTE SL transmission may be reset to MAX_PLT. Alternatively, for example, if such rules are applied, when required power of NR SL transmission exceeds MAX_PNR, the (required) power of NR SL transmission may be reset to MAX_PNR.

According to an embodiment of the present disclosure, a minimum guarantee transmit power value which may be used for LTE SL transmission and NR SL transmission may be set in advance for a UE or may be configured in advance. In the present disclosure, for convenience of description, a minimum guarantee transmit power value which may be used for LTE SL transmission may be referred to as MIN_PLT, and a minimum guarantee transmit power value which may be used for NR SL transmission may be referred to as MIN_PNR. For example, MIN_PLT may be set for channels and/or carrier associated with LTE SL transmission, and MIN_PNR may be set for channels and/or carriers associated with NR SL transmission. For example, channels and/or carriers over which LTE SL transmission is performed may be different from channels and/or carriers over which NR SL transmission is performed. Here, for example, even if a UE may reduce the (required) power of LTE SL transmission based on the second rule, the (required) power of LTE SL transmission may not be less than MIN_PLT Alternatively, for example, even if a UE reduces the (required) power of NR SL transmission based on the second rule, the (required) power of NR SL transmission may not be less than MIN_PNR.

According to an embodiment of the present disclosure, a UE may enable time synchronization between LTE SL transmission/communication and NR SL transmission/communication to match. For example, a UE may enable time and/or frequency synchronization between LTE SL transmission/communication and NR SL transmission/combination to match. For example, for LTE SL transmission/communication and NR SL transmission/communication (over different channels), a UE may derive time and/or frequency synchronization from a (common) synchronization reference source configured in advance. For example, a UE may derive time and/or frequency synchronization for LTE SL transmission/communication and NR SL transmission/communication (over different channels) from synchronization associated with LTE SL transmission/communication. For example, NR SL may be synchronized with LTE SL. Alternatively, for example, a UE may derive time and/or frequency synchronization for LTE SL transmission/communication and NR SL transmission/communication (over different channels) from synchronization associated with NR SL transmission/communication.

Figure 17:
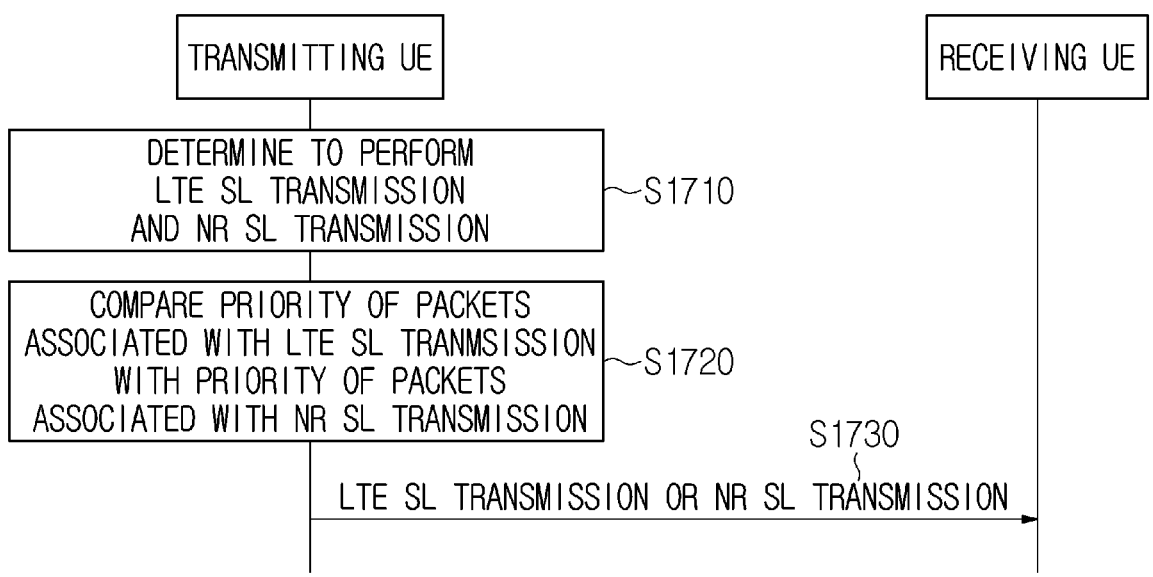
FIG. 17 is a view illustrating a method of, by a UE, performing sidelink transmission based on priority of sidelink transmission, according to an embodiment of the present disclosure.

FIG. 17 is a view illustrating a method of, by a UE, performing sidelink transmission based on priority of sidelink transmission, according to an embodiment of the present disclosure.

Referring to FIG. 17, in step S1710, a UE may determine to perform LTE SL transmission and NR SL transmission. For example, the UE may include a modem associated with LTE SL transmission and a modem associated with NR SL transmission. For example, LTE SL transmission and NR SL transmission may overlap. For example, LTE SL transmission and NR SL transmission partially or entirely overlap in the time domain.

In step S1720, the UE may compare priority of LTE SL transmission with priority of NR SL transmission. For example, the UE may compare priority of packets associated with LTE SL transmission with priority of packets associated with NR SL transmission. For example, the UE may compare priority of a service associated with LTE SL transmission with priority of a service associated with NR SL transmission. For comparison between priorities, the priority of LTE SL transmission and the priority of NR SL transmission may be exchanged between the modem associated with LTE SL transmission and the modem associated with NR SL transmission.

In step S1730, the UE may perform SL transmission associated with the higher priority between LTE SL transmission and NR SL transmission. In contrast, the UE may omit SL transmission associated with lower priority.

For example, Table 6 shows an example of priority of a service associated with LTE SL transmission and priority of a service associated with NR SL transmission. Although a description based on PPPP is given for convenience of description, the priority is not limited to PPPP. For example, priority may be defined in various ways. For example, the same type of common priority is applicable to an NR associated service and an LTE associated service.

TABLE 6

| LTE associated service | PPPP value | NR associated service | PPPP value |
| --- | --- | --- | --- |
| LTE SL service A | 1 | NR SL service D | 1 |
| LTE SL service B | 2 | NR SL service E | 2 |
| LTE SL service C | 3 | NR SL service F | 3 |

For example, in the embodiment of Table 6, it is assumed that a UE determines to transmit LTE SL service A and NR SL service E, and transmission of LTE SL service A and transmission of NR SL service E overlap. For example, transmission of LTE SL service A and transmission of NR SL service E may partially or entirely overlap in the time domain. In this case, a UE may perform only SL transmission associated with high priority and omit transmission associated with low priority. For example, a UE may transmit only LTE SL service A over a first carrier and/or a first channel. In contrast, a UE may not transmit NR SL service E over a second carrier and/or a second channel.

For example, in the embodiment of Table 6, it is assumed that a UE determines to transmit LTE SL service C and NR SL service E, and transmission of LTE SL service C and transmission of NR SL service E overlaps. For example, transmission of LTE SL service C and transmission of NR SL service E may partially or entirely overlap in the time domain. In this case, a UE may perform only SL transmission associated with high priority and omit SL transmission associated with low priority. For example, a UE may transmit only NR SL service E over a second carrier and/or a second channel. In contrast, a UE may not transmit LTE SL service C over a first carrier and/or a first channel.

For example, in the embodiment of Table 6, it is assumed that a UE determines to transmit LTE SL service C and NR SL service F, and transmission of LTE SL service C and transmission of NR SL service F overlap. For example, transmission of LTE SL service C and transmission of NR SL service F may partially or entirely overlap in the time domain. In this case, since priority associated with LTE SL transmission and priority associated with NR SL transmission are the same, a UE may apply at least one of the first to third rules to transmit any one of LTE SL service C or NR SL service F.

Figure 18:
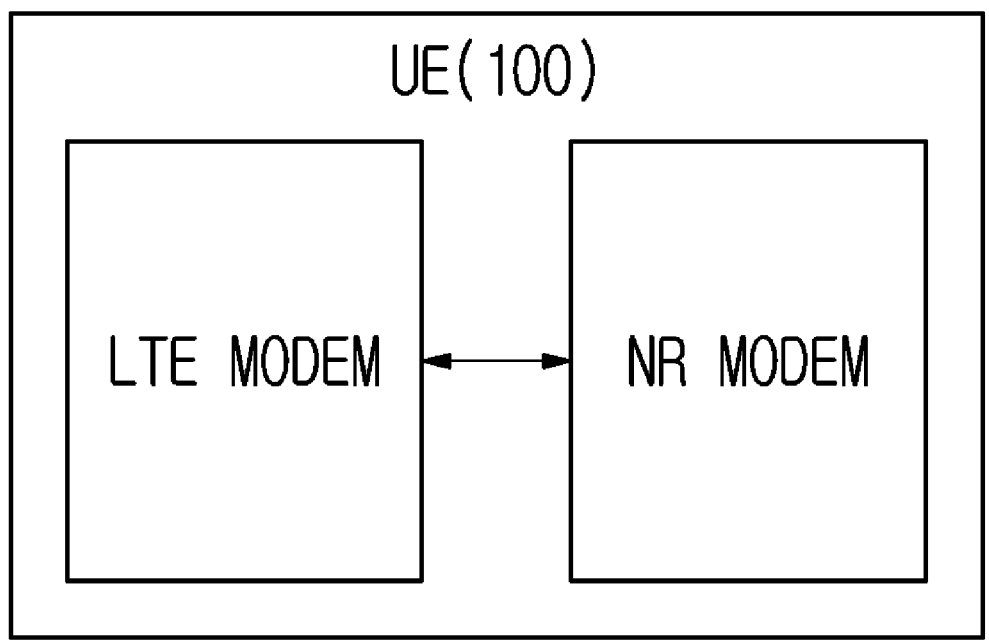
FIG. 18 is a view illustrating an example of a UE 100, according to an embodiment of the present disclosure.

FIG. 18 is a view illustrating an example of a UE 100, according to an embodiment of the present disclosure.

Referring to FIG. 18, a UE may include a modem associated with LTE SL transmission and a modem associated with NR SL transmission. Packets associated with LTE SL transmission generated in a higher layer may be transmitted through the LTE modem. Packets associated with NR SL transmission generated in a higher layer may be transmitted through the NR modem. Here, for example, the LTE modem and the NR modem may be associated with a common higher layer (for example, an application layer). Alternatively, for example, the LTE modem and the NR modem may be associated with different higher layers (for example, a higher layer associated with the LTE modem and a higher layer associated with the NR modem). Each packet may be associated with specific priority. In this case, the LTE modem may not know the priority of packets associated with NR SL transmission, and the NR modem may not know the priority of the packets associated with LTE SL transmission. For comparison between priorities, the priority of the packets associated with LTE SL transmission and the priority of the packets associated with NR SL transmission may be exchanged between the LTE modem and the NR modem. Accordingly, the LTE modem and the NR modem may know the priority of the packets associated with LTE SL transmission and the priority of the packets associated with NR SL transmission. In addition, when LTE SL transmission and NR SL transmission overlap, a UE may compare the priority of the packets associated with LTE SL transmission with the priority of the packets associated with NR SL transmission and perform only SL transmission associated with higher priority.

According to an embodiment of the present disclosure, synchronization associated with NR SL communication may match synchronization associated with LTE SL communication.

Figure 19:
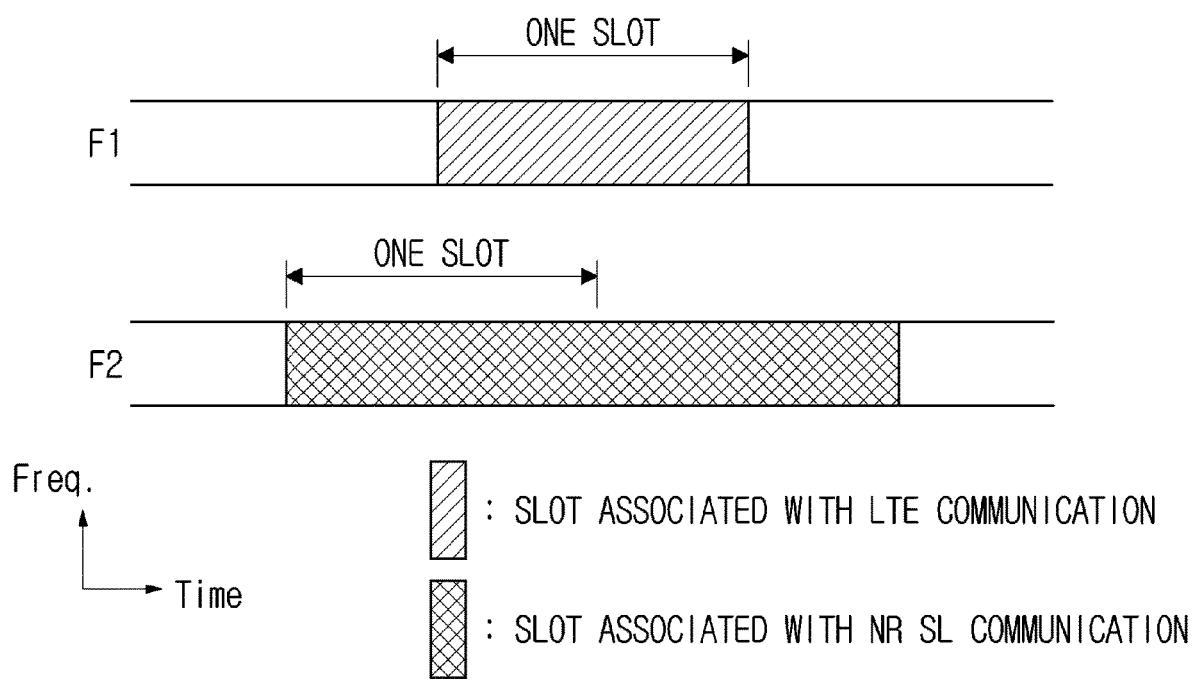
FIG. 19 is a view illustrating problems which may occur when synchronization of NR SL transmission and synchronization of LTE SL transmission do not match.

FIG. 19 is a view illustrating problems which may occur when synchronization of NR SL transmission and synchronization of LTE SL transmission do not match.

Referring to FIG. 19, it is assumed that a UE performs transmission associated with LTE SL at frequency F1 and performs transmission associated with NR SL at frequency F2. F1 and F2 may be located on an inter-frequency or inter-band. Alternatively, F1 and F2 may located on an intra-frequency or intra-band. For example, as described above, when priority associated with LTE SL transmission is higher than priority associated with NR SL transmission, a UE may omit NR SL transmission. In this case, as in the embodiment of FIG. 19, when synchronization associated with LTE SL transmission and synchronization associated with NR SL transmission do not match, a UE may have to drop NR SL transmission over two slots. This may lead to waste of radio resources for SL communication. Although a description is given from the viewpoint of transmission in the embodiment of FIG. 19 for convenience of description, similar problems may occur from the viewpoint of reception.

Accordingly, in order to solve such problems, synchronization of NR SL transmission and synchronization of LTE SL transmission need to match.

Figure 20:
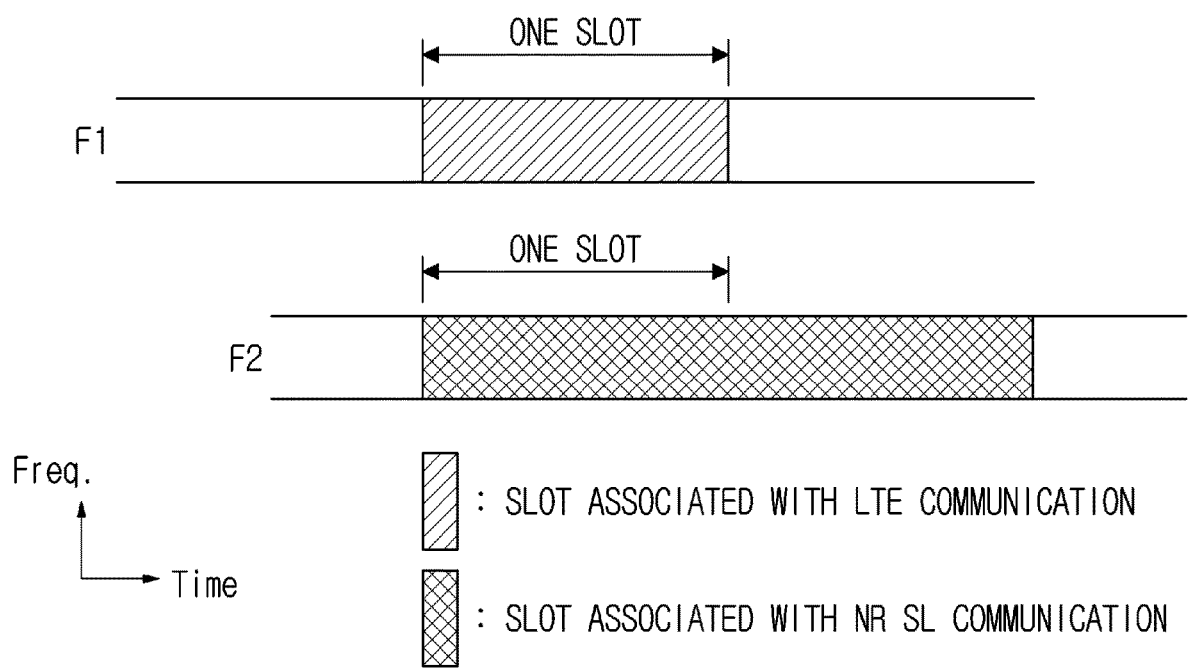
FIG. 20 is a view illustrating an example in which synchronization associated with NR SL communication match synchronization associated with LTE SL communication.

FIG. 20 is a view illustrating an example in which synchronization associated with NR SL communication match synchronization associated with LTE SL communication.

Referring to FIG. 20, a UE may obtain synchronization associated with NR SL communication from synchronization associated with LTE SL communication. That is, NR SL may be synchronized with LTE SL. Accordingly, since priority associated with LTE SL transmission is higher than priority associated with NR SL transmission, even if a UE omits NR SL transmission, it is sufficient for the UE to drop only NR SL transmission over one slot. Accordingly, a UE may efficiently use radio resources for SL communication.

Figure 21:
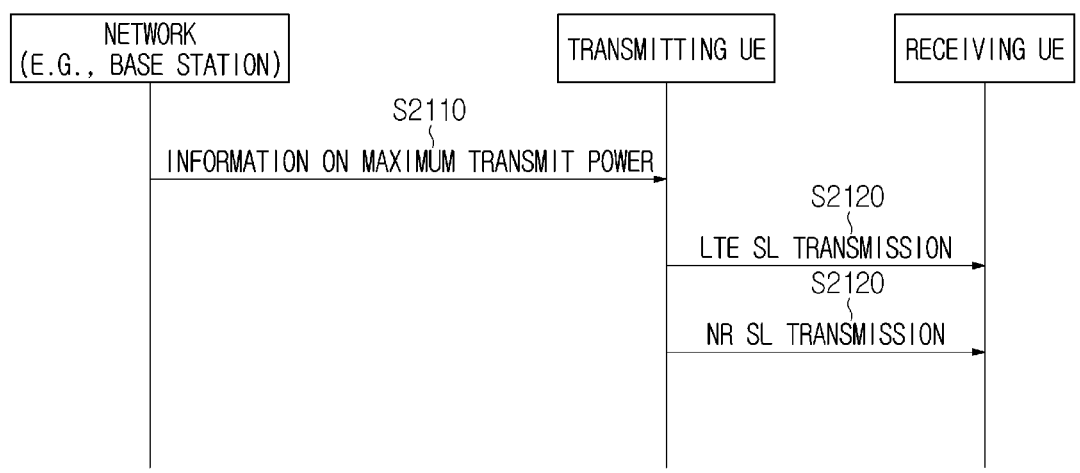
FIG. 21 is a view illustrating a procedure of, by a UE, performing LTE SL transmission or NR SL transmission based on maximum transmit power configured for a carrier, according to an embodiment of the present disclosure.

FIG. 21 is a view illustrating a procedure of, by a UE, performing LTE SL transmission or NR SL transmission based on maximum transmit power configured for a carrier, according to an embodiment of the present disclosure.

Referring to FIG. 21, in step S2110, a network (e.g., a base station) may transmit information on maximum transmit power associated with LTE SL transmission and information on maximum transmit power associated with NR SL transmission to a UE. For example, the information on the maximum transmit power may be configured for the UE or may be set in advance. For example, first maximum transmit power may be configured for a channel and/or carrier associated with LTE SL transmission, and second maximum transmit power may be configured for a channel and/or carrier associated with NR SL transmission. For example, the channel and/or carrier associated with LTE SL transmission may be different from the channel and/or carrier associated with NR SL transmission. For example, LTE SL transmission and NR SL transmission may be performed over an inter-band. For example, LTE SL transmission and NR SL transmission may be performed over an intra-band.

In step S2120, the UE may perform LTE SL transmission over a first channel and/or a first carrier based on the first maximum transmit power. In addition, the UE may perform NR SL transmission over a second channel and/or a second carrier based on the second maximum transmit power.

According to an embodiment of the present disclosure, for the channel/carrier associated with LTE SL transmission and the channel/carrier associated with NR SL transmission, respective maximum allowable power values may be designated. That is, for the channel/carrier associated with LTE SL transmission and the channel/carrier associated with NR SL transmission, static power allocation may be performed.

According to an embodiment of the present disclosure, transmission operation and/or reception operation of NR SL and LTE SL may be limited to match in the time domain. For example, NR SL transmission and LTE SL reception or NR SL reception and LTE SL transmission may not be allowed to partially or entirely overlap in the time domain.

Meanwhile, when LTE SL communication and NR SL communication are performed over different (continuous or discontinuous) channels within an intra-band, transmission of a UE over a specific channel may make reception of a UE over another channel (which partially or entirely overlaps in the time domain) impossible. That is, due to half-duplex problems, transmission of a UE over a specific channel may make reception of a UE over another channel (which partially or entirely overlaps in the time domain) impossible. Here, for example, in consideration of the above problems, according to an embodiment of the present disclosure, transmission/reception operation between LTE SL and NR SL may be performed and/or controlled according to some or all of the rules below.

For example, a UE may not perform NR SL transmission operation when performing LTE SL reception operation. Alternatively, for example, a UE may perform NR SL reception operation when performing LTE SL transmission operation. Alternatively, for example, a UE may not perform LTE SL transmission operation when performing NR SL reception operation. Alternatively, for example, a UE may not perform LTE SL reception operation when performing NR SL transmission operation. For example, when LTE SL reception has higher priority than NR SL transmission, priority of a message received over an LTE SL may be higher than priority of a message transmitted over an NR SL. For example, when LTE SL transmission has higher priority than NR SL reception, priority of a message transmitted over an LTE SL may be higher than priority of a message received over an NR SL. For example, when NR SL reception has higher priority than LTE SL transmission, priority of a message received over an NR SL may be higher than priority of a message transmitted over an LTE SL. For example, when NR SL transmission has higher priority than LTE SL reception, priority of a message transmitted over an NR SL may be higher than priority of a message received over an LTE SL. Here, for example, the priority of the message may be determined by at least one of the first rule, the second rule and/or the third rule. For example, the above-described operation of the UE may include the UE selecting and/or reserving resources associated with NR SL transmission by avoiding a point in time when LTE SL reception operation is performed. For example, the above-described operation of the UE may include the UE performing NR SL reception operation by avoiding a point in time when resources associated with LTE SL transmission are selected and/or reserved. For example, the above-described operation of the UE may include the UE selecting and/or reserving resources associated with LTE SL transmission by avoiding a point in time when NR SL reception operation is performed. For example, the above-described operation of the UE may include the UE performing LTE SL reception operation by avoiding a point in time when resources associated with NR SL transmission are selected and/or reserved.

For example, the UE may avoid message associated (NR_SL or LTE_SL) transmission of (relatively) low priority at a point in time when message associated (LTE SL or NR_SL) sensing of (relatively) high priority is performed. Here, for example, the priority of the message may be determined by at least one of the first rule, the second rule and/or the third rule.

For example, the UE may perform LTE SL transmission and NR SL transmission to partially or entirely overlap in the time domain. For example, when a sum of transmit power required for LTE SL transmission and transmit power required for NR SL transmission does not exceed P_MAX, the UE may perform LTE SL transmission and NR SL transmission to partially or entirely overlap in the time domain. Alternatively, for example, when simultaneous transmission of an LTE SL and an NR SL does not exceed RF capability of the UE, the UE may perform LTE SL transmission and NR SL transmission to partially or entirely overlap in the time domain.

Meanwhile, in an NR system, a flexible slot format may be configured. Accordingly, for example, in the case of an NR system, the number of symbols configuring UL/DL/FLEXIBLE resource in a slot may be set to be partially or entirely different between slots or BWPs.

In the present disclosure, an SL slot may include at least one of a slot over which a UE is capable of performing sidelink communication, a slot over which a UE is capable of performing V2X communication, a slot in which a resource pool for sidelink is configured, and/or a slot in which a resource pool for V2X is configured. In the present disclosure, an SL symbol may include at least one of a slot over which a UE is capable of performing sidelink communication, a slot over which a UE is capable of performing V2X communication, a symbol associated with sidelink communication, and/or a symbol associated with sidelink. For example, an SL symbol may include at least one of a UL symbol and/or a FLEXIBLE (F) symbol.

Figure 22:
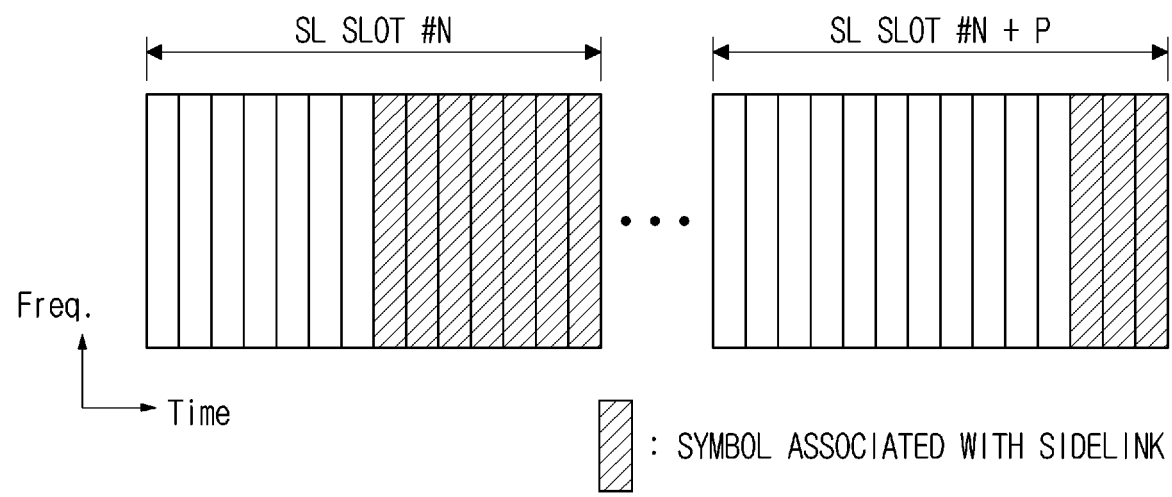
FIG. 22 is a view illustrating problems which may occur as the number of symbols configuring an SL slot is changed.

FIG. 22 is a view illustrating problems which may occur as the number of symbols configuring an SL slot is changed.

Referring to FIG. 22, it is assumed that a UE reserves resources for sidelink transmission in a period P. In this case, a subchannel composed of 7 SL symbols may be present on SL slot #N, whereas a subchannel composed of 3 SL symbols may be present on SL slot #N+P. That is, between SL slot #N and SL slot #N+P, the number of SL symbols may be changed.

In the above case, for example, there may be a problem that a UE does not secure the amount of resources required for message transmission at a specific point in time.

Accordingly, according to an embodiment of the present disclosure, when some or all of the conditions below are satisfied, a transmitting UE may perform transmission over SL slot #N on a preset exceptional pool. Alternatively, for example, when some or all of the conditions below are satisfied, a transmitting UE may perform aperiodic transmission (e.g., ONE-SHOT transmission). For example, a transmitting UE may perform aperiodic transmission over another SL slot. For example, a transmitting UE may perform aperiodic transmission based on randomly selected resources over another SL slot. Alternatively, for example, when some or all of the conditions below are satisfied, a UE may omit sidelink transmission.

- if the number of SL symbols configuring SL slot #N is less than the number of symbols of transmission resources reserved by a UE, for example, if the number of SL symbols configuring SL slot #N is less than the number of symbols of transmission resources reserved by a UE when performing resource re-reservation, and/or
- if the number of SL symbols configuring SL slot #N is different from the number of symbols of transmission resources reserved by a UE, for example, if the number of SL symbols configuring SL slot #N is different from the number of symbols of transmission resources reserved by a UE when performing resource re-reservation, and/or
- if the number of SL symbols configuring SL slot #N is less than the number of symbols of transmission resources reserved by a UE and, at the same time, a difference value is greater than a preset threshold, for example, if the number of SL symbols configuring SL slot #N is less than the number of symbols of transmission resources reserved by a UE when performing resource re-reservation and, at the same time, a difference value is greater than a preset threshold, and/or
- if a (valid) coding rate derived based on transmission resources reserved by a UE cannot be supported by or derived from the number of SL symbols configuring SL slot #N, for example, if a (valid) coding rate derived based on transmission resources reserved by a UE when performing resource re-reservation cannot be supported by or derived from the number of SL symbols configuring SL slot #N, and/or
- if a (valid) coding rate lower than a preset threshold cannot be supported by the number of SL symbols SL slot #N, and/or
- if a (valid) coding rate derived based on transmission resources reserved by a UE cannot be supported by the number of SL symbols configuring SL slot #N and, at the same time, a difference value is greater than a preset threshold, and/or if a (valid) coding rate derived based on transmission resources reserved by a UE when performing resource re-reservation cannot be supported by the number of SL symbols configuring SL slot #N when performing resource re-reservation and, at the same time, a difference value is greater than a preset threshold,
- for example, the threshold may be independently or differently set according to at least one of V2X resource pool, BWP, service type, service requirements, service priority, message generation type, PPPP, PPPR, priority of a logical channel, an identifier of a logical channel and/or numerology, Meanwhile, for example, resource allocation associated with SL communication may be performed according to the above-described rules and/or some rules described in Table 7.

TABLE 7

At least two sidelink resource allocation modes are defined for NR-V2X sidelink communication
Mode 1: Base station schedules sidelink resource(s) to be used by UE for sidelink transmission(s)

TABLE 7-continued

Mode 2: UE determines (i.e. base station does not schedule) sidelink transmission resource(s) within sidelink resources configured by base station/network or pre-configured sidelink resources
Notes:
eNB control of NR sidelink and gNB control of LTE sidelink resources will be separately considered in corresponding agenda items.
Mode-2 definition covers potential sidelink radio-layer functionality or resource allocation sub-modes (subject to further refinement including merging of some or all of them) where UE autonomously selects sidelink resource for transmission, UE assists sidelink resource selection for other UE(s), UE is configured with NR configured grant (type-1 like) for sidelink transmission, and/or UE schedules sidelink transmissions of other UEs
For the study of LTE-V2X and NR-V2X sidelink co-existence, at least the following scenarios are considered from the UEs perspective:
LTE sidelink and NR sidelink do not have any coordinated procedures
LTE sidelink and NR sidelink have coordinated procedures and half-duplex constraints are assumed According to an embodiment of the present disclosure, a UE may transmit information to a base station through a predefined channel (e.g., PUSCH or PUCCH). For example, the information may be information coexistence of NR SL and LTE SL. Here, for example, the base station, which has received the information, may enable NR SL and LTE SL to efficiently coexist on different channels or the same channel. For example, the base station, which has received the information, may enable NR SL and LTE SL to efficiently coexist in different modes on different channels or the same channel. For example, the base station, which has received the information, may enable NR SL and LTE SL to efficiently coexist in the same mode on different channels or the same channel. For example, the information may include at least one of information listed below.

- information on the location of resource associated with NR SL of Mode 2, for example, information on the location of transmission resource or reception resource associated with NR SL of Mode 2, and/or
- information on transmit power associated with NR SL of Mode 2, and/or
- information on priority of a service associated with NR SL of Mode 2, and/or
- information on PPPP associated with NR SL of Mode 2, and/or
- information on PPPR associated with NR SL of Mode 2, and/or
- information on latency budget associated with NR SL of Mode 2, and/or
- information on the location of resource associated with NR SL of Mode 1, for example, information on the location of transmission resource or reception resource associated with NR SL of Mode 1, and/or
- information on transmit power associated with NR SL of Mode 1, and/or
- information on priority of a service associated with NR SL of Mode 1, and/or
- information on PPPP associated with NR SL of Mode 1, and/or
- information on PPPR associated with NR SL of Mode 1, and/or
- information on latency budget associated with NR SL of Mode 1, and/or
- information on the location of resource associated with LTE SL of Mode 2, for example, information on the location of transmission resource or reception resource associated with LTE SL of Mode 2, and/or
- information on transmit power associated with LTE SL of Mode 2, and/or information on priority of a service associated with LTE SL of Mode 2, and/or information on PPPP associated with LTE SL of Mode 2, and/or information on PPPR associated with LTE SL of Mode 2, and/or information on latency budget associated with LTE SL of Mode 2, and/or information on the location of resource associated with LTE SL of Mode 1, for example, information on the location of transmission resource or reception resource associated with LTE SL of Mode 1, and/or information on transmit power associated with LTE SL of Mode 1, and/or information on priority of a service associated with LTE SL of Mode 1, and/or information on PPPP associated with LTE SL of Mode 1, and/or information on PPPR associated with LTE SL of Mode 1, and/or information on latency budget associated with LTE SL of Mode 1;

Herein, for example, the UE may limitedly transmit the information associated with NR SL of Mode 2 and/or the information associated with NR SL of Mode 1 to an LTE base station associated with LTE SL of Mode 1, an NR base station associated with LTE SL of Mode 1, an LTE base station associated with LTE SL of Mode 2, and/or an NR base station associated with LTE SL of Mode 2.

Herein, for example, the UE may limitedly transmit the information associated with LTE SL of Mode 2 and/or the information associated with LTE SL of Mode 1 to an NR base station associated with NR SL of Mode 1, an LTE base station associated with NR SL of Mode 1, an NR base station associated with NR SL of Mode 2, and/or an LTE base station associated with NR SL of Mode 2.

According to an embodiment of the present disclosure, when a UE enables synchronization of NR SL communication to match synchronization of LTE SL communication, the UE may be configured not to transmit synchronization information associated with NR SL communication. Herein, for example, the synchronization may include time synchronization and/or frequency synchronization. For example, synchronization information may include a synchronization signal and/or a PSBCH. For example, the synchronization signal may include a PSSS and/or an SSSS. For example, due to in-device coexistence, the UE may enable synchronization associated with NR SL communication to match synchronization associated with LTE SL communication.

For example, when a UE enables synchronization of NR SL communication to match synchronization of LTE SL communication, the UE may not transmit synchronization signal associated with NR SL communication. For example, when a UE enables synchronization of NR SL communication to match synchronization of LTE SL communication, the UE may not transmit synchronization information associated with NR SL communication on a frequency configured for NR SL communication. For example, the UE may receive a configuration for a frequency for NR SL communication from a base station, another device or another UE. For example, the UE may autonomously configure a frequency for NR SL communication. For example, a frequency configured for NR SL communication may include a carrier configured for NR SL communication, a BWP configured for NR SL communication, and/or a resource pool configured for NR SL communication.

Herein, for example, when the above-described rules are applied, it may be interpreted that NR SL following synchronization of LTE SL communication is set to be (relatively) low (or lowest) in terms of priority of synchronization. For example, synchronization priority of NR SL communication following synchronization of LTE SL communication may be set to be low. For example, synchronization priority of NR SL communication following synchronization following LTE SL communication may be set to be lowest. For example, synchronization priority of NR SL communication following synchronization of LTE SL communication may be set to be lower than that of LTE SL communication. For example, priority of first synchronization associated with NR SL communication obtained from second synchronization associated with LTE SL communication may be set to be lower than that of third synchronization associated with NR sidelink communication. Here, the second synchronization may be obtained based on synchronization information associated with LTE, and the third synchronization may be obtained from synchronization information associated with NR.

According to an embodiment of the present disclosure, a network may set or preset priority of NR SL synchronization information based on the first synchronization and priority of NR SL synchronization information based on the third synchronization for a UE. For example, a network may include a base station and/or RSU.

For example, the network may set priority of NR SL synchronization information based on the first synchronization to be higher than priority of NR SL synchronization information based on the third synchronization. In this case, for example, when the UE detects both the NR SL synchronization information based on the first synchronization and the NR SL synchronization information based on the third synchronization, the UE may perform synchronization using the NR SL synchronization information based on the first synchronization.

For example, the network may set priority of the NR SL synchronization information based on the first synchronization to be lower than priority of the NR SL synchronization information based on the third synchronization. In this case, for example, when the UE detects both the NR SL synchronization information based on the first synchronization and the NR SL synchronization information based on the third synchronization, the UE may perform synchronization using the NR SL synchronization information based on the third synchronization.

According to an embodiment of the present disclosure, a UE may transmit information on a type of a synchronization criterion associated with synchronization of the UE. For example, the information may be transmitted to another UE.

For example, a UE may inform another UE that the UE obtains synchronization associated with NR SL communication from synchronization associated with LTE SL communication. For example, the UE may inform another UE that the UE obtains synchronization associated with NR SL communication from synchronization associated with LTE SL communication, through a first sequence. For example, the first sequence may be at least one of PSSS, SSSS and/or PSBCH DMRS. For example, the UE may inform another UE that the UE obtains synchronization associated with NR SL communication from synchronization associated with LTE SL communication, through information on a PSBCH (e.g., 1 bit). For example, the UE may inform another UE that the UE obtains synchronization associated with NR SL communication from synchronization associated with LTE SL communication, through a first 1 SLSS ID. For example, the UE may inform another UE that the UE obtains synchronization associated with NR SL communication from synchronization associated with LTE SL communication, through a first SSB index. For example, the first SSB index may be scrambled in a PSBCH DMRS sequence or may be included in a PSBCH payload. For example, a network may set or preset at least one of the first sequence, information on the PSBCH, the first SLSS ID and/or the first SSB index for a UE. Accordingly, when a receiving UE receives at least one of the first sequence, information on the PSBCH, the first SLSS ID and/or the first SSB index from a transmitting UE, the receiving UE may determine that the transmitting UE obtains synchronization associated with NR SL communication from synchronization associated with LTE SL communication.

For example, a UE may inform another UE that the UE obtains synchronization associated with NR SL communication based on synchronization information associated with NR SL communication. For example, a UE may inform another UE that the UE obtains synchronization associated with NR SL communication based on synchronization information associated with NR SL communication, through a second sequence. For example, the second sequence may be at least one of a PSSS, SSSS and/or PSBCH DMRS sequence. For example, a UE may inform another UE that the UE obtains synchronization associated with NR SL communication based on synchronization information associated with NR SL communication, through information on a PSBCH (e.g., 1 bit). For example, a UE may inform another UE that the UE obtains synchronization associated with NR SL communication based on synchronization information associated with NR SL communication, through a second SLSS ID. For example, a UE may inform another UE that the UE obtains synchronization associated with NR SL communication based on synchronization information associated with NR SL communication, through a second SSB index. For example, the second SSB index may be scrambled in a PSBCH DMRS sequence or may be included in a PSBCH payload. For example, a network may set or preset at least one of the second sequence, information on the PSBCH, the second SLSS ID and/or the second SSB index for a UE. Accordingly, when a receiving UE receives at least one of the second sequence, information on the PSBCH, the second SLSS ID and/or the second SSB index from a transmitting UE, the receiving UE may determine that the transmitting UE obtains synchronization from synchronization associated with NR SL communication.

Figure 23:
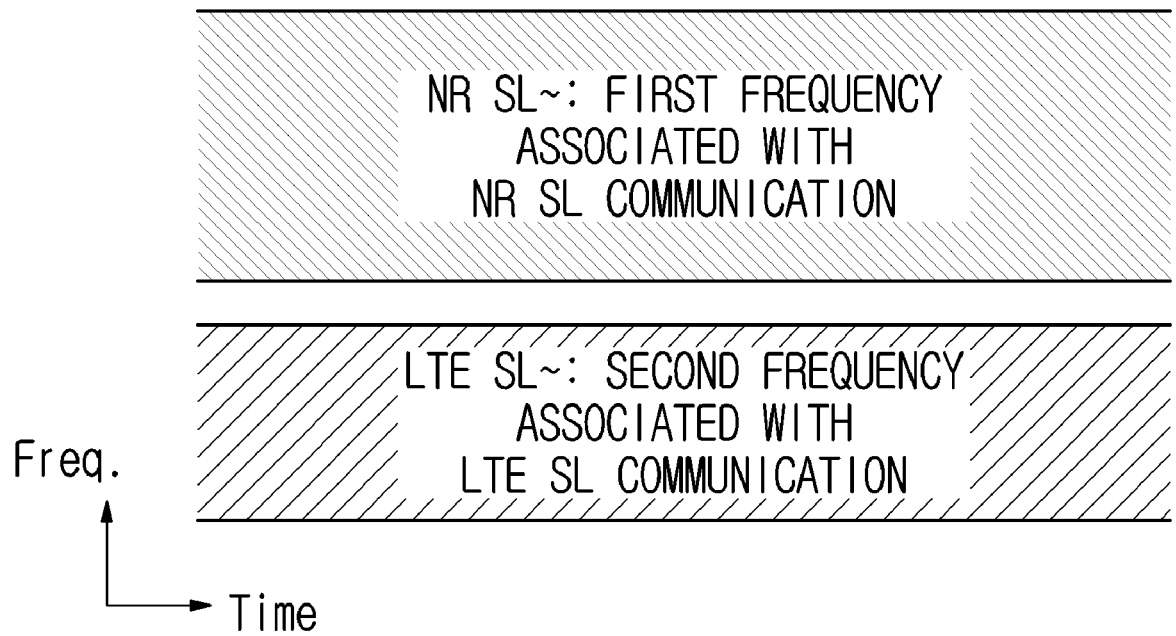
FIG. 23 is a view illustrating a method of, by a UE, determining whether to transmit synchronization information associated with an NR SL, according to an embodiment of the present disclosure.

FIG. 23 is a view illustrating a method of, by a UE, determining whether to transmit synchronization information associated with an NR SL, according to an embodiment of the present disclosure.

Referring to FIG. 23, the UE may configure a first frequency associated with NR SL communication. For example, the UE may receive a configuration for the first frequency associated with NR SL communication from a base station, another UE or another device. For example, the first frequency may include one or more carriers, one or more BWPs and/or one or more resource pools.

For example, the UE may configure a second frequency associated with LTE SL communication. For example, the UE may receive a configuration for the second frequency associated with LTE SL communication from a base station, another UE or another device. For example, the second frequency may include one or more carriers, one or more BWPs and/or one or more resource pools.

For example, the UE may enable synchronization of NR SL communication to match synchronization of LTE SL communication. For example, the UE may enable synchronization of NR SL communication to match synchronization of LTE SL communication. For example, the synchronization may include time synchronization and/or frequency synchronization.

For example, when the UE enables synchronization of NR SL communication to match synchronization of LTE SL communication, the UE may not transmit synchronization information associated with NR SL communication. For example, synchronization information may include a synchronization signal and/or a PSBCH. For example, the synchronization signal may include a PSSS and/or an SSSS. For example, when the UE enables synchronization of NR SL communication to match synchronization of LTE SL communication, the UE may not transmit synchronization information associated with NR SL communication on a first frequency.

For example, when the UE enables synchronization of NR SL communication to match synchronization of LTE SL communication and the UE does not detect synchronization information associated with NR SL communication on a first frequency, the UE may not transmit synchronization information associated with NR SL communication on the first frequency. Additionally/alternatively, for example, when the UE enables synchronization of NR SL communication to match synchronization of LTE SL communication and a RSRP measured by the UE is equal to or less than a threshold, the UE may not transmit synchronization information associated with NR SL communication on the first frequency. Here, for example, the RSRP may be measured based on synchronization information associated with NR SL communication received by the UE on the first frequency. For example, the RSRP may be measured based on a DMRS (Demodulation Reference Signal) on a PSBCH associated with NR SL communication received by the UE on the first frequency. For example, the RSRP may be measured based on a PSSS and/or SSSS associated with NR SL communication received by the UE on the first frequency. Additionally/alternatively, for example, when the UE enables synchronization of NR SL communication to match synchronization of LTE SL communication and a congestion level on the first frequency measured by the UE is equal to or less than a threshold, the UE may not transmit synchronization information associated with NR SL communication on the first frequency. For example, the congestion level may be a CBR.

For example, when the UE enables synchronization of NR SL communication to match synchronization of LTE SL communication and the UE detects synchronization information associated with NR SL communication on the first frequency, the UE may transmit synchronization information associated with NR SL communication on the first frequency. Additionally/alternatively, for example, when the UE enables synchronization of NR SL communication to match synchronization of LTE SL communication and RSRP measured by the UE is equal to or greater than a threshold, the UE may transmit synchronization information associated with NR SL communication on the first frequency. Here, for example, the RSRP may be measured based on synchronization information associated with NR SL communication received by the UE on the first frequency. For example, the RSRP may be measured based on a DMRS (Demodulation Reference Signal) on a PSBCH associated with NR SL communication received by the UE on the first frequency. For example, the RSRP may be measured based on a PSSS and/or SSSS associated with NR SL communication received by the UE on the first frequency. Additionally/alternatively, for example, when the UE enables synchronization of NR SL communication to match synchronization of LTE SL communication and a congestion level on the first frequency measured by the UE is equal to or greater than a threshold, the UE may transmit synchronization information associated with NR SL communication on the first frequency.

According to the above-described embodiments, the UE, which has enabled synchronization of NR SL communication to match synchronization of LTE SL communication, may or may not transmit synchronization information associated with NR SL communication efficiently depending on the situation.

For example, since synchronization requirements of LTE SL communication may be lower than those of NR SL communication, the UE which has enabled synchronization of NR SL communication to match synchronization of LTE SL communication, may not transmit synchronization information on a frequency for NR SL communication. For example, since accuracy requirements of synchronization associated with LTE SL communication may be lower than those of synchronization associated with NR SL communication, the UE, which has enabled synchronization of NR SL communication to match synchronization of LTE SL communication, may not transmit synchronization information on a frequency for NR SL communication.

For example, when the UE, which has enabled synchronization of NR SL communication to match synchronization of LTE SL communication, detects synchronization information associated with NR SL communication on a frequency for NR SL communication, the UE may transmit synchronization information, for another UE which will perform NR SL communication on a frequency for NR SL communication. For example, when a congestion level on a frequency for NR SL communication measured by the UE, which has enabled synchronization of NR SL communication to match synchronization of LTE SL communication, is equal to or greater than a threshold, the UE may transmit synchronization information, for another UE which will perform NR SL communication on a frequency for NR SL communication.

Meanwhile, for example, when the UE performs SL communication, a PSCCH and a PSSCH associated therewith may be multiplexed based on Table 8. For example, the PSCCH and the PSSCH scheduled by the PSCCH may be multiplexed based on Table 8.

TABLE 8

Multiplexing of PSCCH and the associated PSSCH (here, the "associated" means that the PSCCH at least carries information necessary to decode the PSSCH).
1) Option 1: PSCCH and the associated PSSCH are transmitted using non-overlapping time resources.
Option 1A: The frequency resources used by the two channels are the same.
Option 1B: The frequency resources used by the two channels can be different.
2) Option 2: PSCCH and the associated PSSCH are transmitted using non-overlapping frequency resources in the all the time resources used for transmission. The time resources used by the two channels are the same.
3) Option 3: A part of PSCCH and the associated PSSCH are transmitted using overlapping time resources in non-overlapping frequency resources, but another part of the associated PSSCH and/or another part of the PSCCH are transmitted using non-overlapping time resources.

Figure 24:
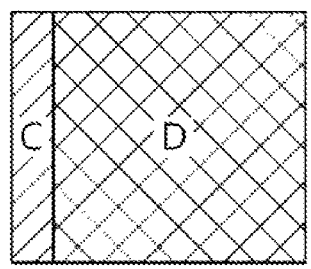
FIG. 24 is a view illustrating multiplexing of a PSCCH and a PSSCH, according to an embodiment of the present disclosure.
Figure 24:
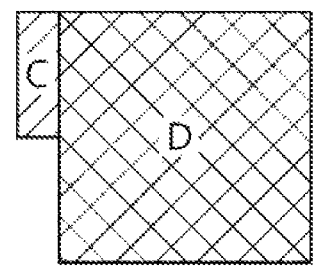
Figure 24:
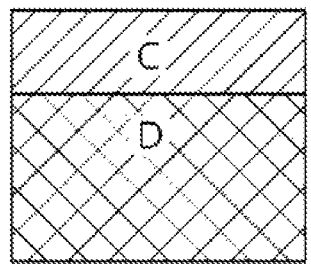
Figure 24:
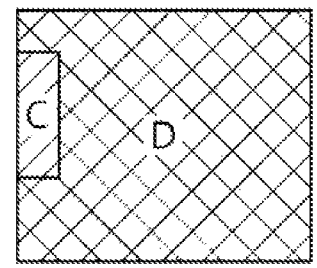
Figure 24:
Figure 24:
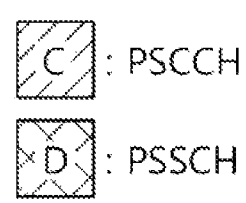

FIG. 24 is a view illustrating multiplexing of a PSCCH and a PSSCH, according to an embodiment of the present disclosure.

Referring to FIG. 24, for example, according to a relation between the location of a start symbol of a PSSCH indicated on a PSCCH and the location of a last symbol of the PSCCH, any one of Option 1A type, Option 1B type or Option 3 type may be interpreted as being implicitly indicated. For example, according to a relation between the location of a start symbol of a PSSCH indicated on a PSCCH and the location of a start symbol of the PSCCH, any one of Option 1A type, Option 1B type or Option 3 type may be interpreted as being implicitly indicated.

For example, when a transmitting UE transmits the location of the start symbol of the PSSCH and the location of the last symbol of the PSCCH to a receiving UE through the PSCCH, the receiving UE may determine that the PSCCH and the PSSCH are multiplexed in any one of Option 1B type or Option 3 type, based on the location of the start symbol of the PSSCH and the location of the last symbol of the PSCCH. For example, when a transmitting UE transmits the location of the start symbol of the PSSCH and the location of the start symbol of the PSCCH to a receiving UE through the PSCCH, the receiving UE may determine that the PSCCH and the PSSCH are multiplexed in any one of Option 1B type or Option 3 type, based on the relation between the location of the start symbol of the PSSCH and the location of the start symbol of the PSCCH.

For example, when the transmitting UE sets the location of the start symbol of the PSSCH to be equal to the location of the start symbol of the PSCCH through the PSCCH, the receiving UE may determine that PSCCH and PSSCH are multiplexed in Option 3 type. Additionally/alternatively, when the transmitting UE sets the location of the start symbol of the PSSCH to a front side of the location of the start symbol of the PSCCH through the PSCCH, the receiving UE may determine that PSCCH and PSSCH are multiplexed in Option 3 type. For example, Option 3 type may be a type in which PSCCH resources and some resources of the PSSCH may be subjected to FDM.

For example, when the transmitting UE sets the location of the start symbol of the PSSCH to a next symbol (e.g., symbol #N+1) of the last symbol (e.g., symbol #N) of the PSCCH through the PSCCH, the receiving UE may determine that PSCCH and PSSCH are multiplexed in Option 1B type. For example, Option 1B type may be a type in which PSCCH and PSSCH are subjected to TDM. Additionally/alternatively, for example, Option 1B type may be a type in which the size of the frequency resource of the PSCCH is less than that of the frequency resource of the PSSCH.

For example, when the transmitting UE sets the location of the start symbol of the PSSCH to a next symbol (e.g., symbol #N+1) of the last symbol (e.g., symbol #N) of the PSCCH through the PSCCH, the receiving UE may determine that PSCCH and PSSCH are multiplexed in Option 1A type. For example, Option 1A type may be a type in which PSCCH and PSSCH are subjected to TDM. Additionally/alternatively, for example, Option 1A type may be a type in which the size of the frequency resource of the PSCCH is equal to that of the frequency resource of the PSSCH.

Figure 25:
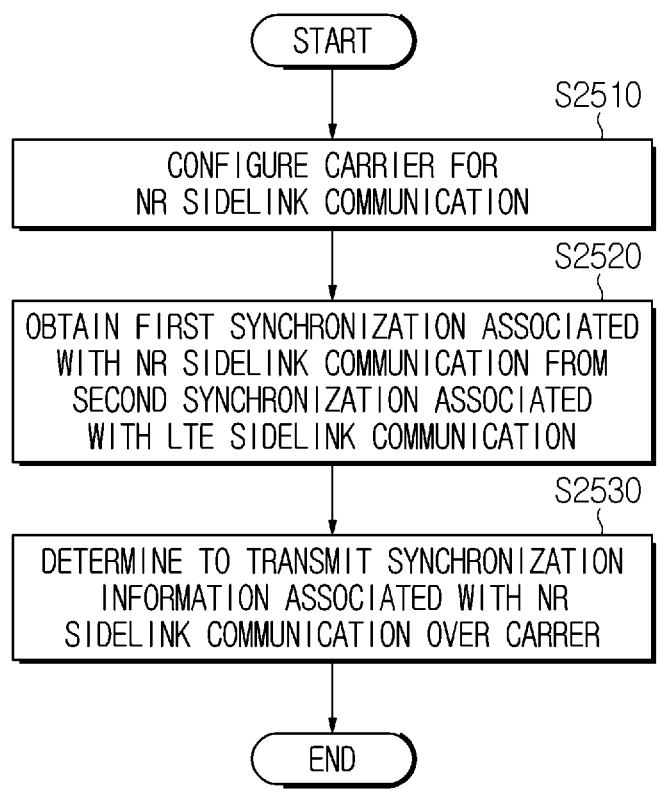
FIG. 25 is a view illustrating a method of, by a first device 100, performing sidelink communication, according to an embodiment of the present disclosure.

FIG. 25 is a view illustrating a method of, by a first device 100, performing sidelink communication, according to an embodiment of the present disclosure.

Referring to FIG. 25, in step S2510, the first device 100 may configure a carrier for NR sidelink communication. For example, the carrier may include one or more bandwidth parts (BWPs) or one or more resource pools.

In step S2520, the first device 100 may obtain first synchronization associated with NR sidelink communication from second synchronization associated with long term evolution (LTE) sidelink communication. For example, the first synchronization or the second synchronization may include at least one of time synchronization or frequency synchronization. For example, requirements of synchronization associated with NR sidelink communication may be higher those of synchronization associated with LTE sidelink communication.

In step S2530, the first device 100 may determine whether to transmit synchronization information associated with NR sidelink communication over the carrier. For example, the synchronization information may include at least one of a PSSS (Primary Sidelink Synchronization Signal), an SSSS (Secondary Sidelink Synchronization Signal), or a PSBCH (Physical Sidelink Broadcast Channel).

For example, priority of first synchronization associated with NR sidelink communication obtained from second synchronization associated with LTE sidelink communication may be set to be lower than that of third synchronization associated with NR sidelink communication. Here, for example, the second synchronization may be obtained based on synchronization information associated with LTE and the third synchronization may be obtained based on synchronization information associated with NR.

Additionally, the first device 100 may transmit information on a synchronization criterion associated with the first device 100 over the carrier. Here, for example, the information on the synchronization criterion may include information on a synchronization criterion associated with LTE or information on a synchronization criterion associated with NR.

For example, synchronization information associated with NR sidelink communication may not be transmitted by the first device 100 over the carrier. For example, based on that the first device 100 does not detect synchronization information associated with NR sidelink communication over the carrier, the first device 100 may determine that synchronization information associated with NR sidelink communication is not transmitted over the carrier. For example, based on that reference signal received power (RSRP) measured by the first device 100 is less than a threshold, the first device 100 may determine that synchronization information associated with NR sidelink communication is not transmitted over the carrier. Here, for example, the RSRP may be measured based on synchronization information associated with NR sidelink communication received over the carrier. For example, based on that a congestion level on the carrier measured by the first device 100 is lower than a threshold, the first device 100 may determine that synchronization information associated with NR sidelink communication is not transmitted over the carrier.

For example, based on that the first device 100 detects synchronization information associated with NR sidelink communication over the carrier, the first device 100 may determine that synchronization information associated with NR sidelink communication is transmitted over the carrier.

For example, based on that reference signal received power (RSRP) measured by the first device 100 is equal to or greater than a threshold, the first device 100 may determine that synchronization information associated with NR sidelink communication is transmitted over the carrier. Here, for example, the RSRP may be measured based on synchronization information associated with NR sidelink communication received over the carrier. For example, based on that a congestion level on the carrier measured by the first device 100 is equal to or greater than a threshold, the first device 100 may determine that synchronization information associated with NR sidelink communication is transmitted over the carrier.

Various embodiments of the present disclosure may be independently implemented. Alternatively, various embodiments of the present disclosure may be mutually combined or merged. For example, although various embodiments of the present disclosure are described based on the 3GPP system for convenience of description, various embodiments of the present disclosure may be extended to other systems in addition to the 3GPP system. For example, various embodiments of the present disclosure are not limited to direct communication between UEs and may be used in uplink or downlink. In this case, base station or relay nodes may use the methods proposed according to various embodiments of the present disclosure. For example, some of various embodiments of the present disclosure may be limitedly applied to only resource allocation mode 1. For example, some of various embodiments of the present disclosure may be limitedly applied to only resource allocation mode 2. For example, some of various embodiments of the present disclosure may be limitedly applied to a pre-configured/signaled (specific) V2X channel/signal transmission (e.g., PSSCH and/or (associated) PSCCH and/or PSBCH). For example, some of various embodiments of the present disclosure may be limitedly applied to only the case where a PSSCH and an (associated) PSCCH are adjacently transmitted (in the frequency domain). For example, some of various embodiments of the present disclosure may be limitedly applied to only the case where a PSSCH and an (associated) PSCCH are non-adjacently transmitted (in the frequency domain). For example, some of various embodiments of the present disclosure may be limitedly applied to only the case where pre-configured/signaled MCS and/or coding rate and/or RB value/range based transmission is performed. For example, some of various embodiments of the present disclosure may be limitedly applied to only the case where the locations and/or number of synchronization signal (transmission and/or reception) resources (and/or the locations and number of V2X resource pool related subframes (and/or the sizes and/or number of subchannels)) are the same (and/or (partially) different). For example, some of various embodiments of the present disclosure may be limitedly extended and applied to only (V2X) communication between a base station and a UE. For example, some of various embodiments of the present disclosure may be limitedly applied to only at least one of unicast (SIDELINK) communication, groupcast (SIDELINK) communication and/or broadcast (SIDELINK) communication.

Hereinafter, device(s) to which various embodiments of the present disclosure can be applied will be described.

The various descriptions, functions, procedures, proposals, methods, and/or operational flowcharts of the present disclosure described in this document may be applied to, without being limited to, various fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 26:
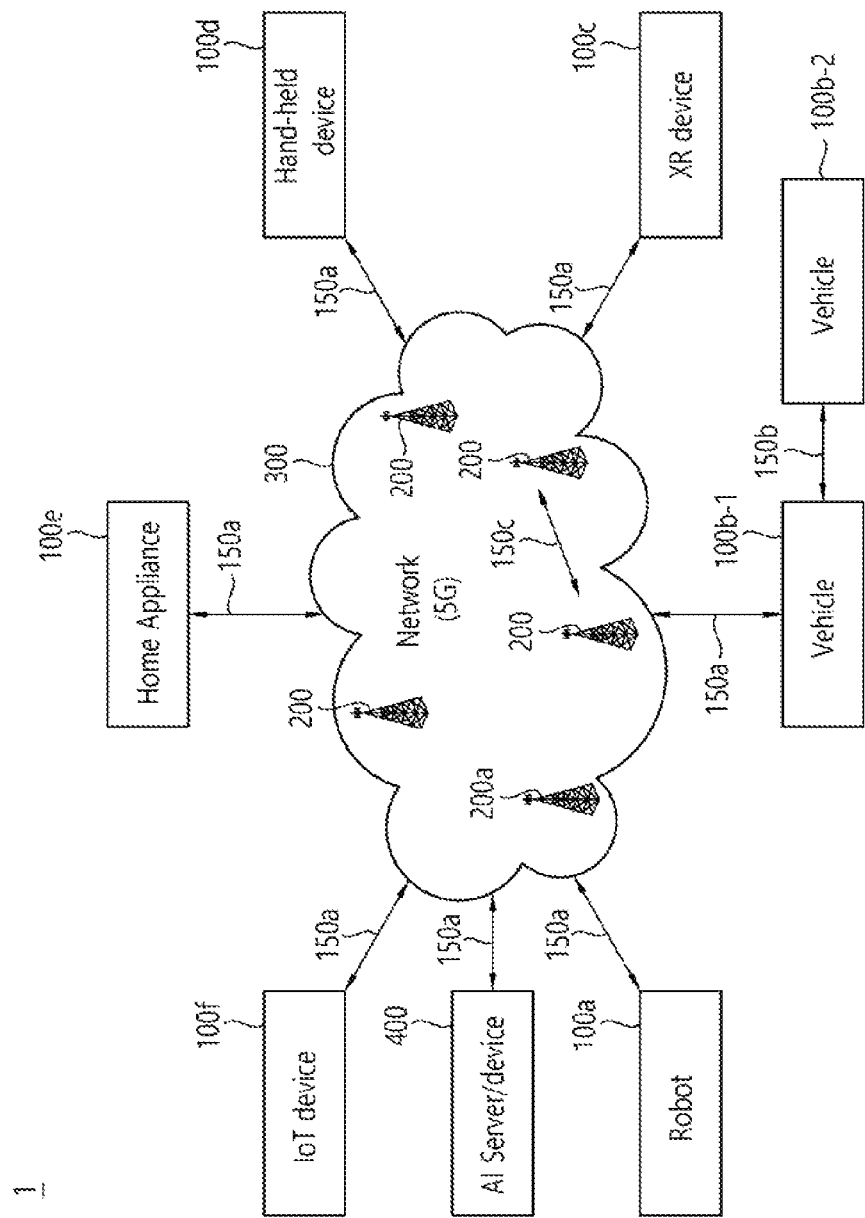
FIG. 26 shows a communication system (1), in accordance with an embodiment of the present disclosure.

FIG. 26 shows a communication system (1) in accordance with an embodiment of the present disclosure.

Referring to FIG. 26, a communication system (1) to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100a), vehicles (100b-1, 100b-2), an eXtended Reality (XR) device (100c), a hand-held device (100d), a home appliance (100e), an Internet of Things (IoT) device (100f), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200a) may operate as a BS/network node with respect to other wireless devices.

The wireless devices (100a~100f) may be connected to the network (300) via the BSs (200). An AI technology may be applied to the wireless devices (100a~100f) and the wireless devices (100a~100f) may be connected to the AI server (400) via the network (300). The network (300) may be configured using a 3G network, a 4G (e.g., LTE) network, or a 5G (e.g., NR) network. Although the wireless devices (100a~100f) may communicate with each other through the BSs (200)/network (300), the wireless devices (100a~100f) may perform direct communication (e.g., sidelink communication) with each other without passing through the BSs/network. For example, the vehicles (100b-1, 100b-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100a~100f).

Wireless communication/connections (150a, 150b, 150c) may be established between the wireless devices (100a~100f)/BS (200), or BS (200)/BS (200). Herein, the wireless communication/connections may be established through various RATs (e.g., 5G NR) such as uplink/downlink communication (150a), sidelink communication (150b) (or, D2D communication), or inter BS communication (e.g. relay, Integrated Access Backhaul (IAB)). The wireless devices and the BSs/the wireless devices may transmit/receive radio signals to/from each other through the wireless communication/connections (150a, 150b). For example, the wireless communication/connections (150a, 150b) may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 27:
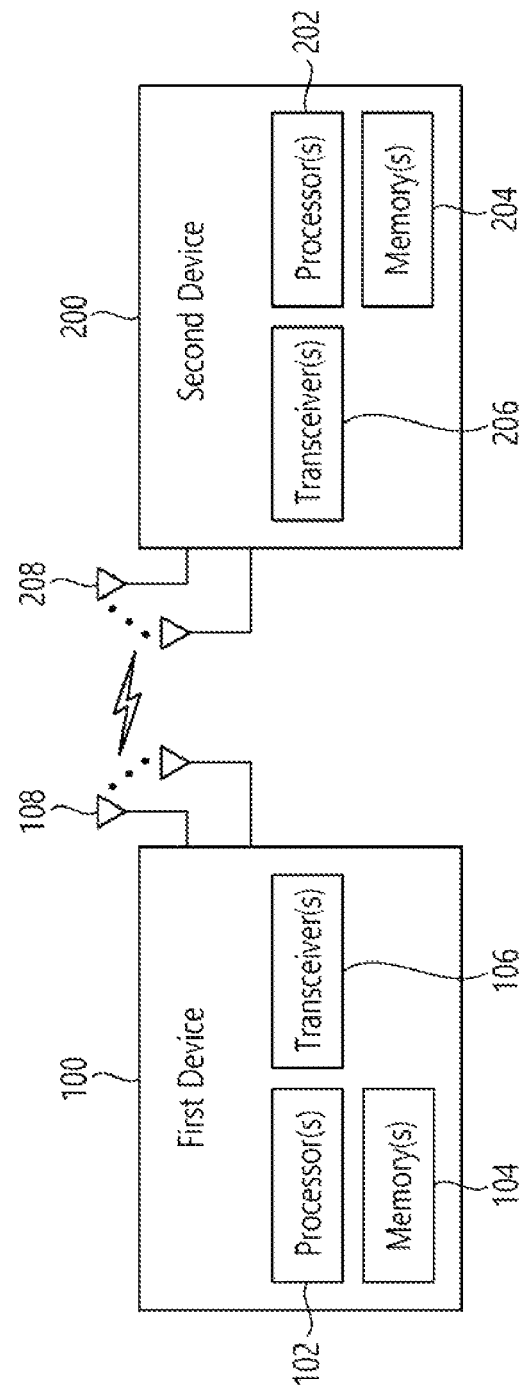
FIG. 27 shows wireless devices, in accordance with an embodiment of the present disclosure.

FIG. 27 shows wireless devices in accordance with an embodiment of the present disclosure.

Referring to FIG. 27, a first wireless device (100) and a second wireless device (200) may transmit radio signals through various RATs (e.g., LTE and NR). Herein, {the first wireless device (100) and the second wireless device (200)} may correspond to {the wireless device (100x) and the BS (200)} and/or {the wireless device (100x) and the wireless device (100x)} of FIG. 26.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including commands for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be apart of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present disclosure, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (106) and then store information obtained by processing the fourth information/signals in the memory(s) (204). The memory(s) (204) may be connected to the processor(s) (202) and may store various information related to operations of the processor(s) (202). For example, the memory(s) (204) may store software code including commands for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202)

and transmit and/or receive radio signals through one or more antennas (208). Each of the transceiver(s) (206) may include a transmitter and/or a receiver. The transceiver(s) (206) may be interchangeably used with RF unit(s). In the present disclosure, the wireless device may represent a communication modem/circuit/chip.

Hereinafter, hardware elements of the wireless devices (100, 200) will be described more specifically. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, commands, and/or a set of commands.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, etc., from RF band signals into baseband signals in order to process received user data, control information, radio signals/channels, etc., using the one or more processors (102, 202). The one or more transceivers (106, 206) may convert the user data, control information, radio signals/channels, etc., processed using the one or more processors (102, 202) from the base band signals into the RF band signals. To this end, the one or more transceivers (106, 206) may include (analog) oscillators and/or filters.

Figure 28:
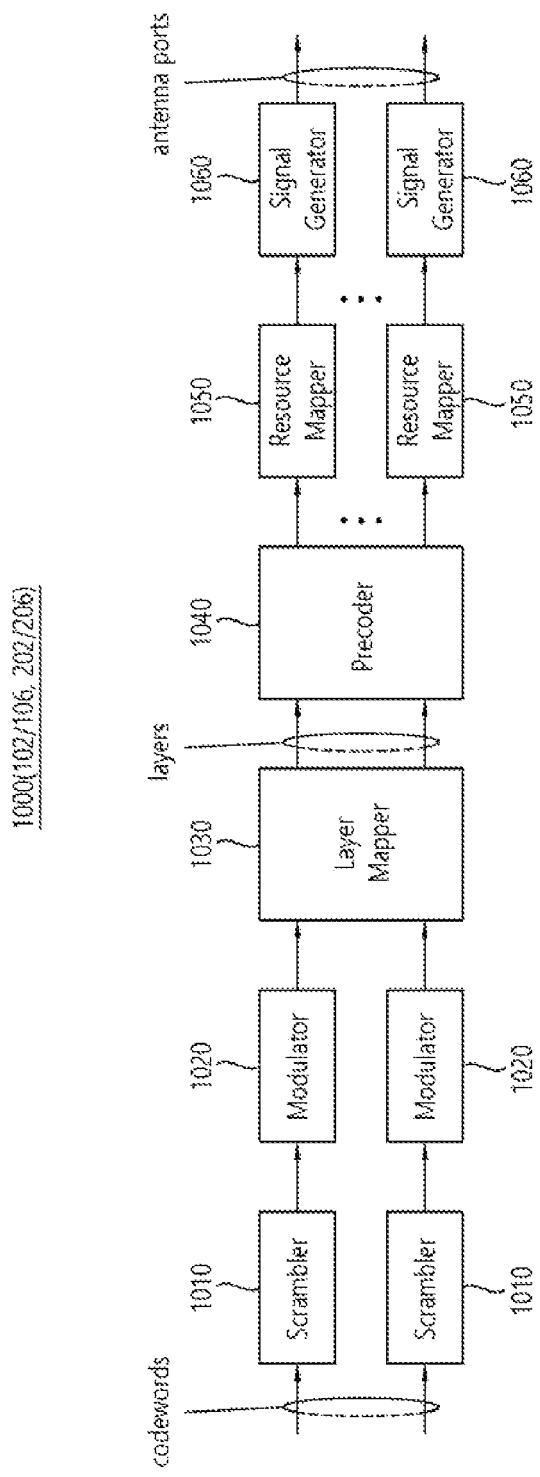
FIG. 28 shows a signal process circuit for a transmission signal, in accordance with an embodiment of the present disclosure.

FIG. 28 shows a signal process circuit for a transmission signal in accordance with an embodiment of the present disclosure.

Referring to FIG. 28, a signal processing circuit (1000) may include scramblers (1010), modulators (1020), a layer mapper (1030), a precoder (1040), resource mappers (1050), and signal generators (1060). An operation/function of FIG. 28 may be performed, without being limited to, the processors (102, 202) and/or the transceivers (106, 206) of FIG. 27. Hardware elements of FIG. 28 may be implemented by the processors (102, 202) and/or the transceivers (106, 206) of FIG. 27. For example, blocks 1010~1060 may be implemented by the processors (102, 202) of FIG. 27. Alternatively, the blocks 1010~1050 may be implemented by the processors (102, 202) of FIG. 27 and the block 1060 may be implemented by the transceivers (106, 206) of FIG. 27.

Codewords may be converted into radio signals via the signal processing circuit (1000) of FIG. 28. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports and M is the number of transport layers. The precoder (1040) may perform precoding after performing transform precoding (e.g., DFT) for complex modulation symbols. Alternatively, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures (1010~1060) of FIG. 28. For example, the wireless devices (e.g., 100, 200 of FIG. 27) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 29:
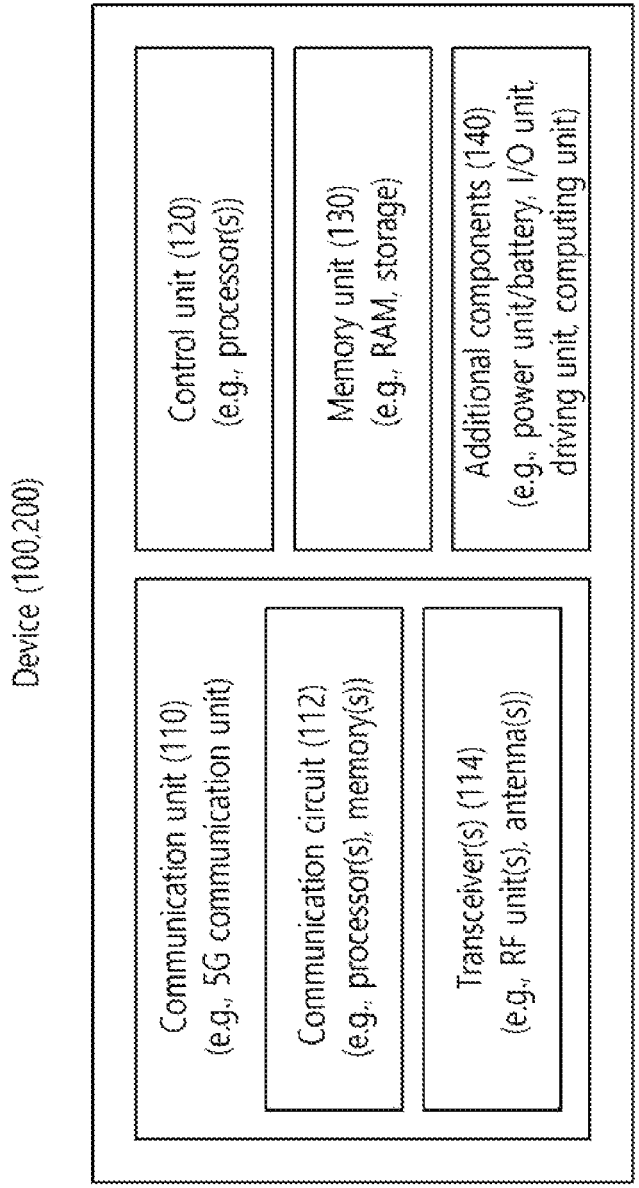
FIG. 29 shows another example of a wireless device, in accordance with an embodiment of the present disclosure.

FIG. 29 shows another example of a wireless device in accordance with an embodiment of the present disclosure. The wireless device may be implemented in various forms according to a use-case/service (refer to FIG. 26).

Referring to FIG. 29, wireless devices (100, 200) may correspond to the wireless devices (100, 200) of FIG. 27 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 27. For example, the transceiver(s) (114) may include the one or more transceivers (106, 206) and/or the one or more antennas (108, 208) of FIG. 27. The control unit (120) is electrically connected to the communication unit (110), the memory (130), and the additional components (140) and controls overall operation of the wireless devices. For example, the control unit (120) may control an electric/mechanical operation of the wireless device based on programs/code/commands/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 26), the vehicles (100b-1 and 100b-2 of FIG. 26), the XR device (100c of FIG. 26), the hand-held device (100d of FIG. 26), the home appliance (100e of FIG. 26), the IoT device (100f of FIG. 26), a digital broadcast terminal, a hologram device, a public safety device, an MTC device, a medicine device, a fintech device (or a finance device), a security device, a climate/environment device, the AI server/device (400 of FIG. 26), the BSs (200 of FIG. 26), a network node, etc. The wireless device may be used in a mobile or fixed place according to a use-example/service.

In FIG. 29, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 29 will be described in detail with reference to the drawings.

Figure 30:
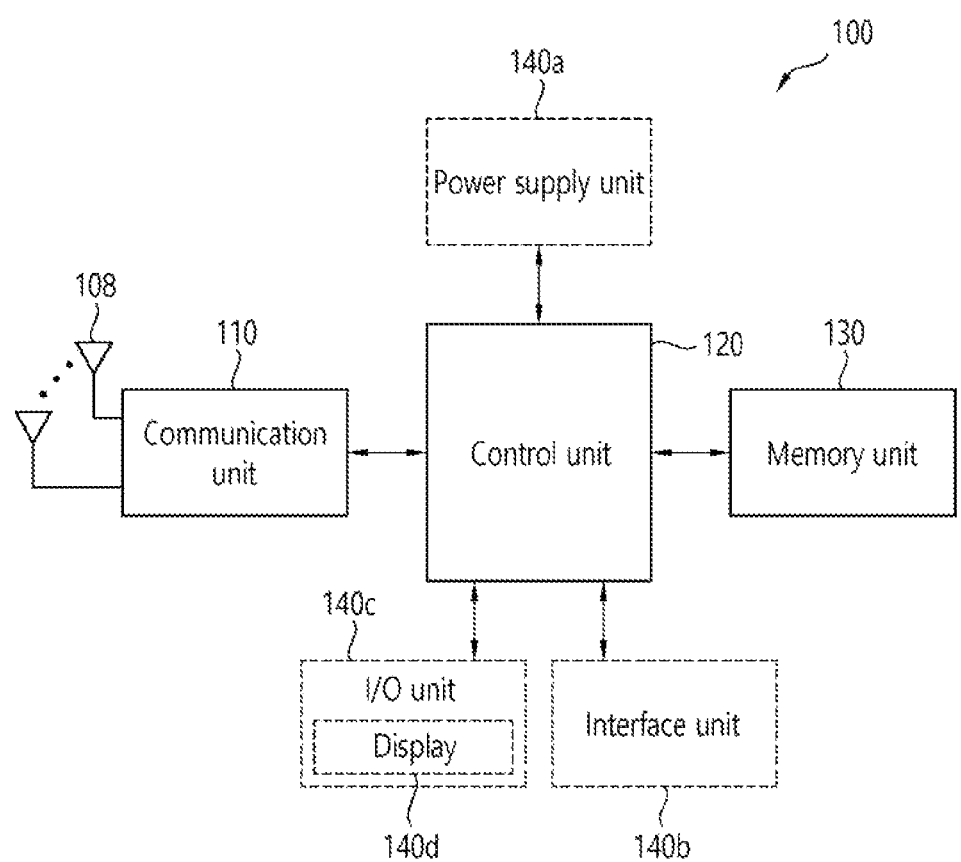
FIG. 30 shows a hand-held device, in accordance with an embodiment of the present disclosure.

FIG. 30 shows a hand-held device in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 30, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110~130/140a~140c correspond to the blocks 110~130/140 of FIG. 29, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/commands needed to drive the hand-held device (100). The memory unit (130) may store input/output data/information. The power supply unit (140a) may supply power to the hand-held device (100) and include a wired/wireless charging circuit, a battery, etc. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 31:
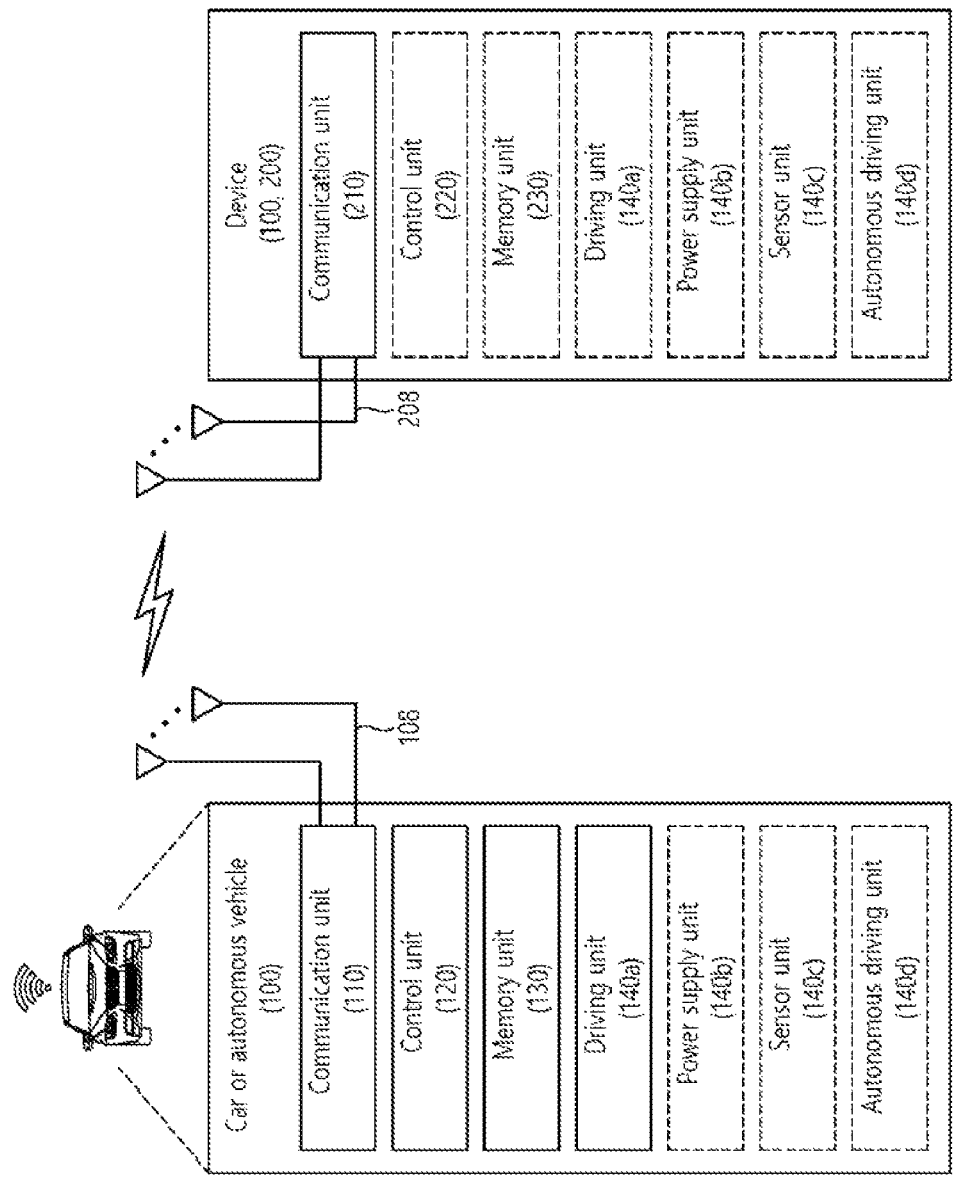
FIG. 31 shows a vehicle or an autonomous vehicle, in accordance with an embodiment of the present disclosure.

FIG. 31 shows a vehicle or an autonomous vehicle in accordance with an embodiment of the present disclosure. The vehicle or autonomous vehicle may be implemented by a mobile robot, a car, a train, a manned/unmanned Aerial Vehicle (AV), a ship, etc.

Referring to FIG. 31, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a~140d correspond to the blocks 110/130/140 of FIG. 29, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, etc. The power supply unit (140b) may supply power to the vehicle or the autonomous vehicle (100) and include a wired/wireless charging circuit, a battery, etc. The sensor unit (140c) may obtain a vehicle state, ambient environment information, user information, etc. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit (110) may receive map data, traffic information data, etc., from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Figure 32:
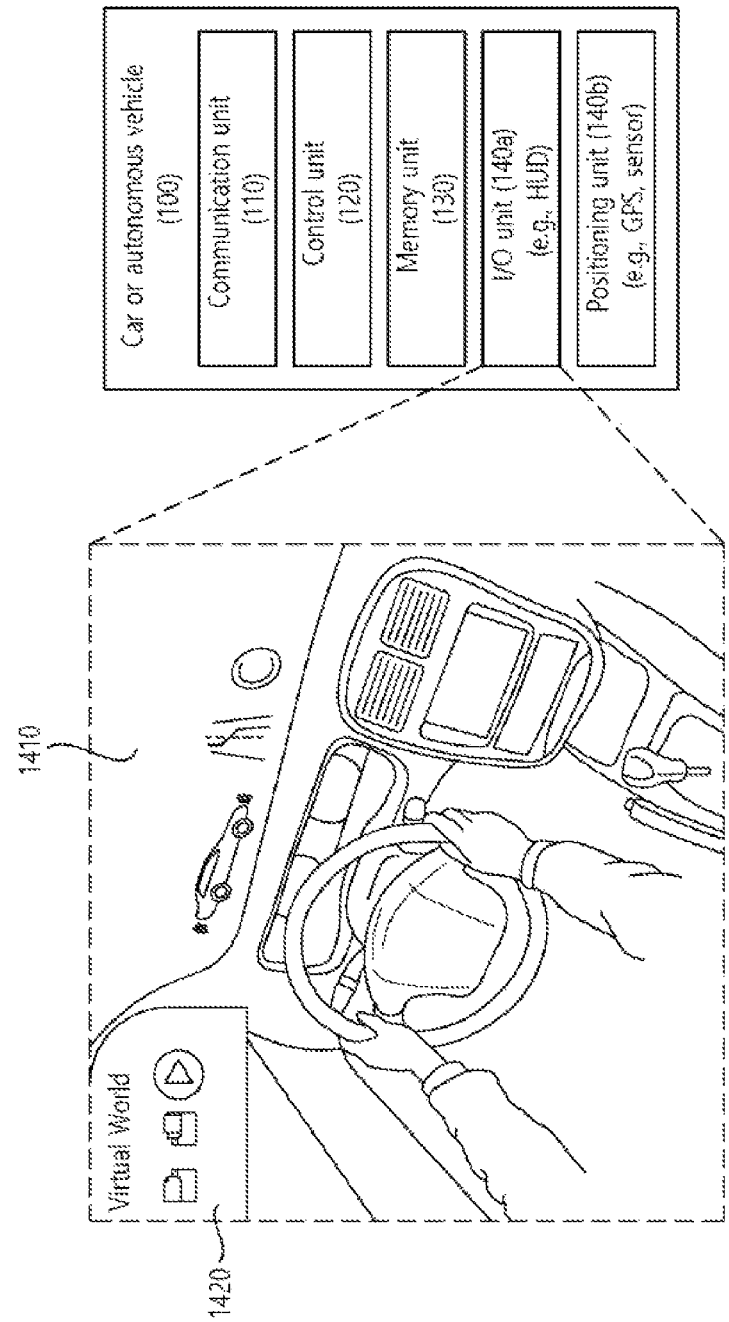
FIG. 32 shows a vehicle, in accordance with an embodiment of the present disclosure.

FIG. 32 shows a vehicle in accordance with an embodiment of the present disclosure. The vehicle may be implemented as a transport means, an aerial vehicle, a ship, etc.

Referring to FIG. 32, a vehicle (100) may include a communication unit (110), a control unit (120), a memory unit (130), an I/O unit (140a), and a positioning unit (140b). Herein, the blocks 110~130/140a~140b correspond to blocks 110~130/140 of FIG. 29.

The communication unit (110) may transmit and receive signals (e.g., data and control signals) to and from external devices such as other vehicles or BSs. The control unit (120) may perform various operations by controlling constituent elements of the vehicle (100). The memory unit (130) may store data/parameters/programs/code/commands for supporting various functions of the vehicle (100). The I/O unit (140a) may output an AR/VR object based on information within the memory unit (130). The I/O unit (140a) may include an HUD. The positioning unit (140b) may obtain information on the position of the vehicle (100). The position information may include information on an absolute position of the vehicle (100), information on the position of the vehicle (100) within a traveling lane, acceleration information, and information on the position of the vehicle (100) from a neighboring vehicle. The positioning unit (140b) may include a GPS and various sensors.

As an example, the communication unit (110) of the vehicle (100) may receive map information and traffic information from an external server and store the received information in the memory unit (130). The positioning unit (140b) may obtain the vehicle position information through the GPS and various sensors and store the obtained information in the memory unit (130). The control unit (120) may generate a virtual object based on the map information, traffic information, and vehicle position information and the I/O unit (140a) may display the generated virtual object in a window in the vehicle (1410, 1420). The control unit (120) may determine whether the vehicle (100) normally drives within a traveling lane, based on the vehicle position information. If the vehicle (100) abnormally exits from the traveling lane, the control unit (120) may display a warning on the window in the vehicle through the I/O unit (140a). In addition, the control unit (120) may broadcast a warning message regarding driving abnormality to neighboring vehicles through the communication unit (110). According to situation, the control unit (120) may transmit the vehicle position information and the information on driving/vehicle abnormality to related organizations.

Figure 33:
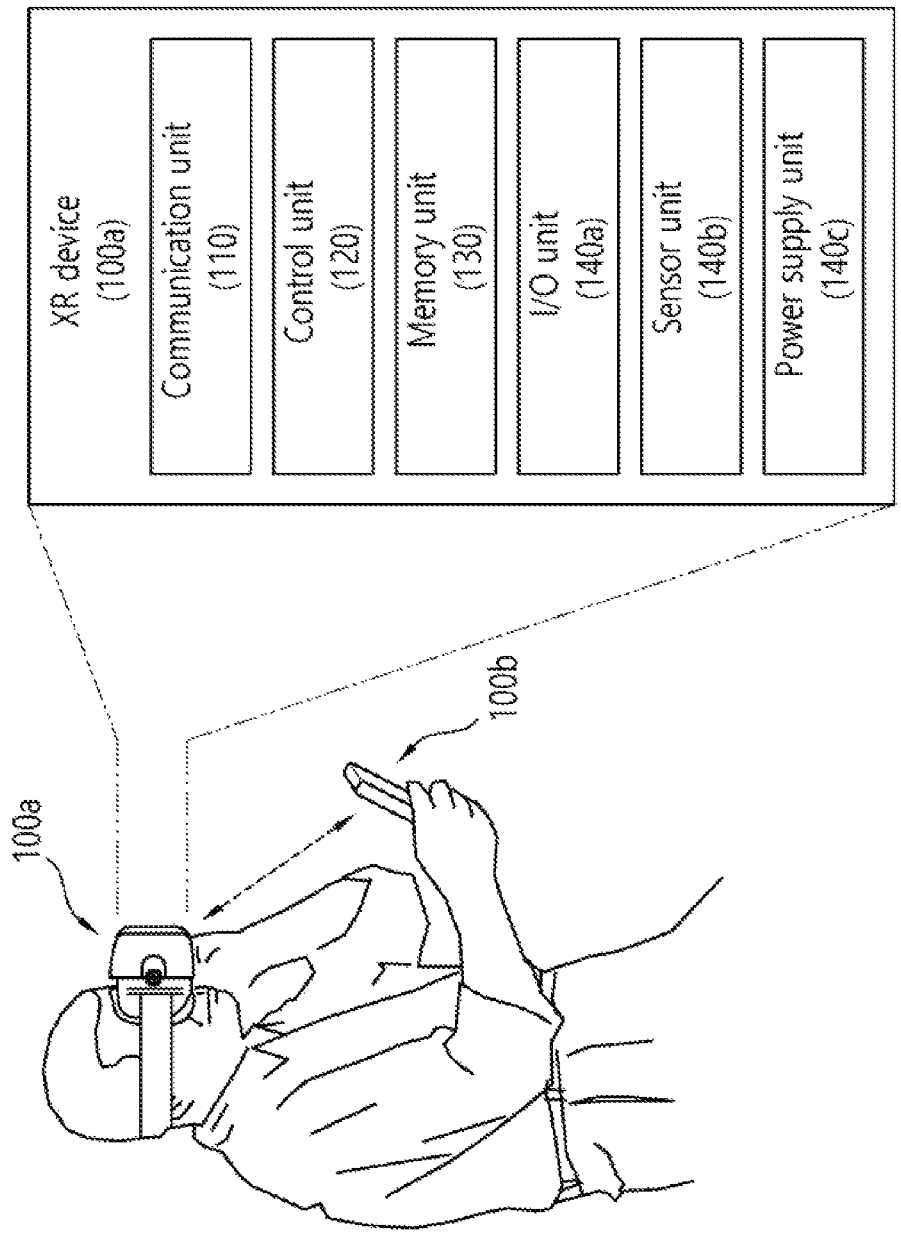
FIG. 33 shows an XR device, in accordance with an embodiment of the present disclosure.

FIG. 33 shows an XR device in accordance with an embodiment of the present disclosure. The XR device may be implemented by an HMD, an HUD mounted in a vehicle, a television, a smartphone, a computer, a wearable device, a home appliance, a digital signage, a vehicle, a robot, etc.

Referring to FIG. 33, an XR device (100a) may include a communication unit (110), a control unit (120), a memory unit (130), an I/O unit (140a), a sensor unit (140b), and a power supply unit (140c). Herein, the blocks 110~130/140a~140c correspond to the blocks 110~130/140 of FIG. 29, respectively.

The communication unit (110) may transmit and receive signals (e.g., media data and control signals) to and from external devices such as other wireless devices, hand-held devices, or media servers. The media data may include video, images, and sound. The control unit (120) may perform various operations by controlling constituent elements of the XR device (100a). For example, the control unit (120) may be configured to control and/or perform procedures such as video/image acquisition, (video/image) encoding, and metadata generation and processing. The memory unit (130) may store data/parameters/programs/code/commands needed to drive the XR device (100a)/generate XR object. The I/O unit (140a) may obtain control information and data from the exterior and output the generated XR object. The I/O unit (140a) may include a camera, a microphone, a user input unit, a display unit, a speaker, and/or a haptic module. The sensor unit (140b) may obtain an XR device state, surrounding environment information, user information, etc. The sensor unit (140b) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone and/or a radar. The power supply unit (140c) may supply power to the XR device (100a) and include a wired/wireless charging circuit, a battery, etc.

For example, the memory unit (130) of the XR device (100a) may include information (e.g., data) needed to generate the XR object (e.g., an AR/VR/MR object). The I/O unit (140a) may receive a command for manipulating the XR device (100a) from a user and the control unit (120) may drive the XR device (100a) according to a driving command of a user. For example, when a user desires to watch a film or news through the XR device (100a), the control unit (120) transmits content request information to another device (e.g., a hand-held device (100b)) or a media server through the communication unit (130). The communication unit (130) may download/stream content such as films or news from another device (e.g., the hand-held device (100b)) or the media server to the memory unit (130). The control unit (120) may control and/or perform procedures such as video/image acquisition, (video/image) encoding, and metadata generation/processing with respect to the content and generate/output the XR object based on information on a surrounding space or a real object obtained through the I/O unit (140a)/sensor unit (140b).

The XR device (100a) may be wirelessly connected to the hand-held device (100b) through the communication unit (110) and the operation of the XR device (100a) may be controlled by the hand-held device (100b). For example, the hand-held device (100b) may operate as a controller of the XR device (100a). To this end, the XR device (100a) may obtain information on a 3D position of the hand-held device (100b) and generate and output an XR object corresponding to the hand-held device (100b).

Figure 34:
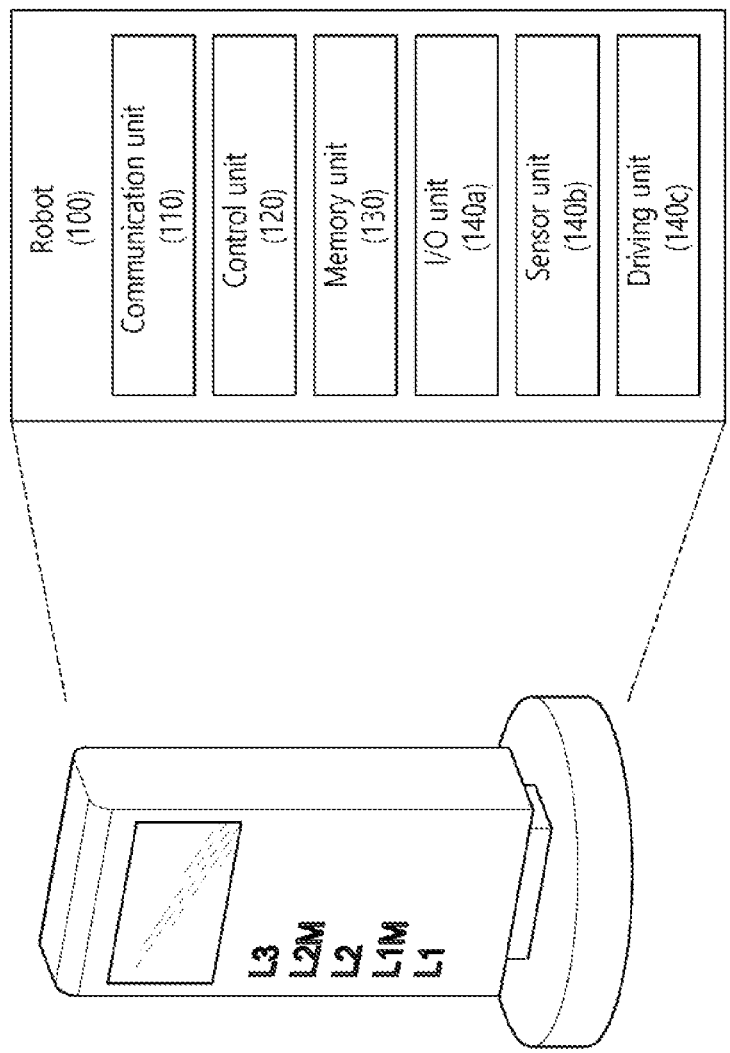
FIG. 34 shows a robot, in accordance with an embodiment of the present disclosure.

FIG. 34 shows a robot in accordance with an embodiment of the present disclosure. The robot may be categorized into an industrial robot, a medical robot, a household robot, a military robot, etc., according to a used purpose or field.

Referring to FIG. 34, a robot (100) may include a communication unit (110), a control unit (120), a memory unit (130), an I/O unit (140a), a sensor unit (140b), and a driving unit (140c). Herein, the blocks 110~130/140a~140c correspond to the blocks 110~130/140 of FIG. 29, respectively.

The communication unit (110) may transmit and receive signals (e.g., driving information and control signals) to and from external devices such as other wireless devices, other robots, or control servers. The control unit (120) may perform various operations by controlling constituent elements of the robot (100). The memory unit (130) may store data/parameters/programs/code/commands for supporting various functions of the robot (100). The I/O unit (140a) may obtain information from the exterior of the robot (100) and output information to the exterior of the robot (100). The I/O unit (140a) may include a camera, a microphone, a user input unit, a display unit, a speaker, and/or a haptic module. The sensor unit (140b) may obtain internal information of the robot (100), surrounding environment information, user information, etc. The sensor unit (140b) may include a proximity sensor, an illumination sensor, an acceleration sensor, a magnetic sensor, a gyro sensor, an inertial sensor, an IR sensor, a fingerprint recognition sensor, an ultrasonic sensor, a light sensor, a microphone, a radar, etc. The driving unit (140c) may perform various physical operations such as movement of robot joints. In addition, the driving unit (140c) may cause the robot (100) to travel on the road or to fly. The driving unit (140c) may include an actuator, a motor, a wheel, a brake, a propeller, etc.

Figure 35:
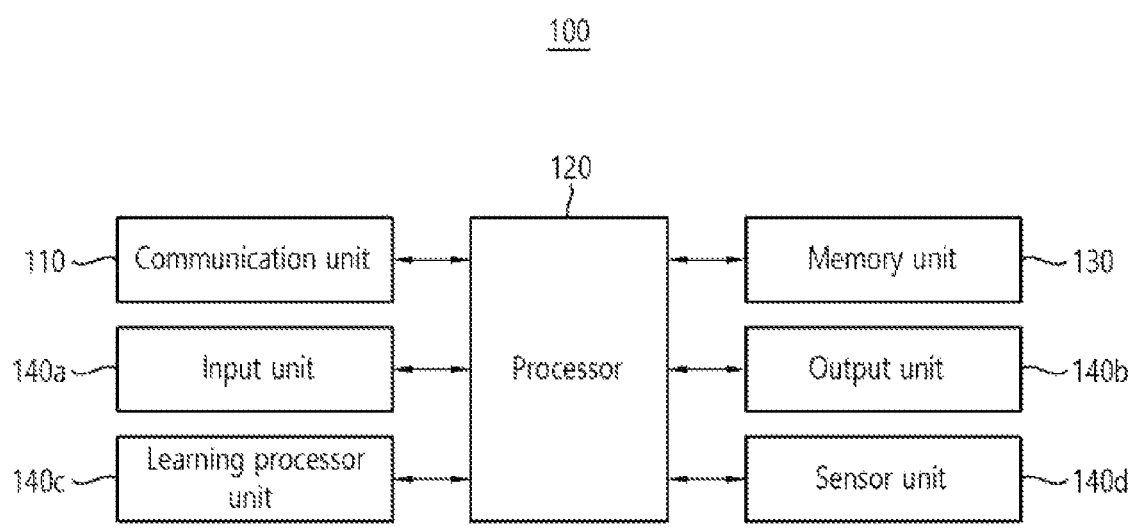
FIG. 35 shows an AI device, in accordance with an embodiment of the present disclosure.

FIG. 35 shows an AI device in accordance with an embodiment of the present disclosure. The AI device may be implemented by a fixed device or a mobile device, such as a TV, a projector, a smartphone, a PC, a notebook, a digital broadcast terminal, a tablet PC, a wearable device, a Set Top Box (STB), a radio, a washing machine, a refrigerator, a digital signage, a robot, a vehicle, etc.

Referring to FIG. 35, an AI device (100) may include a communication unit (110), a control unit (120), a memory unit (130), an I/O unit (140a/140b), a learning processor unit (140c), and a sensor unit (140d). The blocks 110~130/140a~140d correspond to blocks 110~130/140 of FIG. 29, respectively.

The communication unit (110) may transmit and receive wired/radio signals (e.g., sensor information, user input, learning models, or control signals) to and from external devices such as other AI devices (e.g., 100x, 200, or 400 of FIG. 26) or an AI server (e.g., 400 of FIG. 26) using wired/wireless communication technology. To this end, the communication unit (110) may transmit information within the memory unit (130) to an external device and transmit a signal received from the external device to the memory unit (130).

The control unit (120) may determine at least one feasible operation of the AI device (100), based on information which is determined or generated using a data analysis algorithm or a machine learning algorithm. The control unit (120) may perform an operation determined by controlling constituent elements of the AI device (100). For example, the control unit (120) may request, search, receive, or use data of the learning processor unit (140c) or the memory unit (130) and control the constituent elements of the AI device (100) to perform a predicted operation or an operation determined to be preferred among at least one feasible operation. The control unit (120) may collect history information including the operation contents of the AI device (100) and operation feedback by a user and store the collected information in the memory unit (130) or the learning processor unit (140c) or transmit the collected information to an external device such as an AI server (400 of FIG. 26). The collected history information may be used to update a learning model.

The memory unit (130) may store data for supporting various functions of the AI device (100). For example, the memory unit (130) may store data obtained from the input unit (140a), data obtained from the communication unit (110), output data of the learning processor unit (140c), and data obtained from the sensor unit (140). The memory unit (130) may store control information and/or software code needed to operate/drive the control unit (120).

The input unit (140a) may obtain various types of data from the exterior of the AI device (100). For example, the input unit (140a) may obtain learning data for model learning, and input data to which the learning model is to be applied. The input unit (140a) may include a camera, a microphone, and/or a user input unit. The output unit (140b) may generate output related to a visual, auditory, or tactile sense. The output unit (140b) may include a display unit, a speaker, and/or a haptic module. The sensing unit (140) may obtain at least one of internal information of the AI device (100), surrounding environment information of the AI device (100), and user information, using various sensors. The sensor unit (140) may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, a light sensor, a microphone, and/or a radar.

The learning processor unit (140c) may learn a model consisting of artificial neural networks, using learning data. The learning processor unit (140c) may perform AI processing together with the learning processor unit of the AI server (400 of FIG. 26). The learning processor unit (140c) may process information received from an external device through the communication unit (110) and/or information stored in the memory unit (130). In addition, an output value of the learning processor unit (140c) may be transmitted to the external device through the communication unit (110) and may be stored in the memory unit (130).

Claims in the present description can be combined in various ways. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method of, by a first device, performing sidelink communication, the method comprising:
   configuring a carrier for New RAT (NR) sidelink communication;
   obtaining first synchronization associated with the NR sidelink communication from second synchronization associated with Long Term Evolution (LTE) sidelink communication; and
   determining whether to transmit synchronization information associated with the NR sidelink communication over the carrier,
   wherein priority of the first synchronization associated with the NR sidelink communication obtained from the second synchronization associated with the LTE sidelink communication is set to be lower than priority of third synchronization associated with the NR sidelink communication,
   wherein the second synchronization is obtained based on synchronization information associated with LTE, and
   wherein the third synchronization is obtained based on synchronization information associated with NR.

2. The method of claim 1, wherein the carrier comprises one or more bandwidth part (BWP) or one or more resource pools.

3. The method of claim 1, wherein the first synchronization or the second synchronization comprises at least one of time synchronization or frequency synchronization.

4. The method of claim 1, wherein the synchronization information comprises at least one of a primary sidelink synchronization signal (PPPP), a secondary sidelink synchronization signal (SSSS) or a physical sidelink broadcast channel (PSBCH).

5. The method of claim 1, further comprising:
   transmitting information on a synchronization criterion associated with the first device over the carrier, wherein the information on the synchronization criterion comprises information on a synchronization criterion associated with LTE or information on a synchronization criterion associated with NR.

6. The method of claim 1, wherein synchronization information associated with the NR sidelink communication is not transmitted over the carrier by the first device.

7. The method of claim 1, wherein, based on that the first device does not detect the synchronization information associated with the NR sidelink communication over the carrier, the first device determines that the synchronization information associated with the NR sidelink communication is not transmitted over the carrier.

8. The method of claim 1,
   wherein, based on that reference signal received power (RSRP) measured by the first device 100 is lower than a threshold, the first device determines that the synchronization information associated with the NR sidelink communication is not transmitted over the carrier, and wherein the RSRP is measured based on the synchronization information associated with the NR sidelink communication received over the carrier.

9. The method of claim 1, wherein, based on that a congestion level on the carrier measured by the first device is lower than a threshold, the first device determines that the synchronization information associated with the NR sidelink communication is not transmitted over the carrier.

10. The method of claim 1, wherein, based on that the first device detects the synchronization information associated with the NR sidelink communication over the carrier, the first device determines that the synchronization information associated with the NR sidelink communication is transmitted over the carrier.

11. The method of claim 1,
wherein, based on that reference signal received power (RSRP) measured by the first device is equal to or greater than a threshold, the first device determines that the synchronization information associated with the NR sidelink communication is transmitted over the carrier, and
wherein the RSRP is measured based on synchronization the information associated with the NR sidelink communication received over the carrier.

12. The method of claim 1, wherein, based on that a congestion level on the carrier measured by the first device is equal to or greater than a threshold, the first device determines that the synchronization information associated with the NR sidelink communication is transmitted over the carrier.

13. The method of claim 1, wherein requirements of the synchronization associated with the NR sidelink are higher than those of the synchronization associated with the LTE sidelink communication.

14. A first device for performing sidelink communication, the first device comprising:
one or more memories;
one or more transceivers; and
one or more processors configured to connect the one or more memories and the one or more transceivers,
wherein the processor is configured to:
configure a carrier for New RAT (NR) sidelink communication;
obtain first synchronization associated with the NR sidelink communication from second synchronization associated with Long Term Evolution (LTE) sidelink communication; and
determine whether to transmit synchronization information associated with the NR sidelink communication over the carrier,
wherein priority of the first synchronization associated with the NR sidelink communication obtained from the second synchronization associated with the LTE sidelink communication is set to be lower than priority of third synchronization associated with the NR sidelink communication,
wherein the second synchronization is obtained based on synchronization information associated with LTE, and
wherein the third synchronization is obtained based on synchronization information associated with NR.

* * * * *